(12) United States Patent
Schwartz et al.

(10) Patent No.: US 7,716,243 B2
(45) Date of Patent: May 11, 2010

(54) PROVISIONS FOR VALIDATING CONTENT USING A CONTENT REGISTRATION AUTHORITY

(75) Inventors: Eyal Schwartz, Bellevue, WA (US); Cesare J. Saretto, Seattle, WA (US); Ranjib S. Badh, Sammamish, WA (US); Walter V. von Koch, Seattle, WA (US); Adam C. Czeisler, Seattle, WA (US); Christian Fortini, Sammamish, WA (US); Ryan M. Hurst, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 607 days.

(21) Appl. No.: 11/065,983

(22) Filed: Feb. 25, 2005

(65) Prior Publication Data

US 2006/0195914 A1    Aug. 31, 2006

(51) Int. Cl.
*G06F 17/30* (2006.01)

(52) U.S. Cl. .................... 707/783; 707/694; 707/784; 707/785

(58) Field of Classification Search .................... 707/3, 707/9, 10, 694, 783, 784, 785; 705/38, 53, 705/59, 51; 726/23, 5; 713/201, 165, 202; 380/233, 286; 709/217, 224
See application file for complete search history.

(56) References Cited

U.S. PATENT DOCUMENTS

| | | | |
|---|---|---|---|
| 6,411,716 B1 * | 6/2002 | Brickell ...................... 380/286 |
| 7,069,451 B1 * | 6/2006 | Ginter et al. .................. 705/51 |
| 7,095,854 B1 * | 8/2006 | Ginter et al. ................ 380/233 |
| 7,178,037 B2 * | 2/2007 | Shimada et al. ............. 713/193 |
| 2001/0051996 A1 * | 12/2001 | Cooper et al. ................ 709/217 |
| 2002/0052835 A1 * | 5/2002 | Toscano ........................ 705/38 |
| 2002/0069176 A1 * | 6/2002 | Newman ....................... 705/53 |
| 2002/0120577 A1 * | 8/2002 | Hans et al. .................... 705/59 |
| 2004/0010717 A1 * | 1/2004 | Simec et al. ................. 713/201 |
| 2004/0107368 A1 * | 6/2004 | Colvin ........................ 713/202 |
| 2004/0139318 A1 * | 7/2004 | Fiala et al. .................. 713/165 |
| 2004/0225894 A1 * | 11/2004 | Colvin ........................ 713/200 |

(Continued)

OTHER PUBLICATIONS

Francesco Gennai et al., "Integrating Security Services with the Automatic Processing of E-mail Content", Google, 2001, pp. 1-2.*

(Continued)

*Primary Examiner*—Thuy N Pardo
(74) *Attorney, Agent, or Firm*—Lee & Hayes, PLLC

(57) ABSTRACT

Strategies are described for validating content transferred over a communication channel using a more effective approach than heretofore provided in the art. A content registration authority is provided which registers the content disseminated by one or more content providers to one or more client devices. A client device which receives content that has been registered can securely consume the content, based on an assumption that a content provider which furnishes the content is entrusted by the content registration authority to provide the content, and without prompting a user of the client device to expressly approve the content provider. In a first solution, the content registration authority registers the content by issuing a certification stamp; in a second solution, the content registration authority registers the content by storing registration information in a central repository. The content may contain instructions which perform operations in the context of an instant messenger application.

20 Claims, 11 Drawing Sheets

U.S. PATENT DOCUMENTS

2006/0053483 A1* 3/2006 Beattie et al. .................. 726/5
2006/0053490 A1* 3/2006 Herz et al. .................... 726/23
2007/0174453 A1* 7/2007 Donoho et al. ............. 709/224
2007/0271187 A1* 11/2007 Kurihara et al. ............... 705/51

OTHER PUBLICATIONS

Vicky Liu et al., "Visually sealed and digitally signed documents", ACM, 2004, pp. 287-294.*

"Introduction to Public Key InfrastructureSite," available at ArticSoft Technologies Limited of Centennial, CO, <<http://www.articsoftcom/wp_pki_intro.htm>>, accessed on Nov. 8, 2005, 5 pages.

"Signing and Checking Code with Authenticode," MSDN data center provided by Microsoft Corporation of Redmond, WA, available at <<http://msdn.microsoft.com/library/default.asp?url=/workshop/security/authcode/signing.asp>>, accessed on Nov. 8, 2005, 17 pages.

"PKCS #7: Cryptographic Message Syntax Standard," An RSA Laboratories Technical Note, Version 1.5, Revised Nov. 1, 1993, available at <<ftp://ftp.rsasecurity.com/pub/pkcs/doc/pkcs-7.doc>>, accessed on Nov. 8, 2005, 30 apges.

Mahendra Palsule , "Security with ActiveX Authenticode," Chapter 23, available at <<http://docs.rinet.ru/ZhPP/ch23.htm>>, accessed on Nov. 8, 2005, 16 pages.

List of online resources provided by VeriSign Inc., of Mountain View, CA, available at <<http://www.verisign.com/Resources/>>, accessed on Nov. 8, 2005, 2 pages.

Macromedia homepage, provided by Macromedia Inc. of San Francisco, CA, available at <<http://www.macromedia.com/macromedia/contact/>>, accessed on Nov. 8, 2005, 5 pages.

MSN Messenger homepage, provided by Microsoft Corporation of Redmond, WA, available at <<http://messenger.msn.com/Xp/Default.aspx>>, accessed on Nov. 8, 2005, 2 pages.

Yahoo! Messenger homepage, provided by Yahoo! of Sunnyvale, CA, available at <<http://messenger.yahoo.com/?ovchn=GGL&ovcpn=US_Can_Branded-Generic&ovcrn=yahoo+messenger&ovtac=PPC>>, accessed on Nov. 8, 2005, 2 pages.

AOL Instant Messenger homepage, provided by America Online of Dulles, VA, available at <<http://www.aim.com/>>, accessed on Nov. 8, 2005, 1 page.

* cited by examiner

General Architecture

Solution B

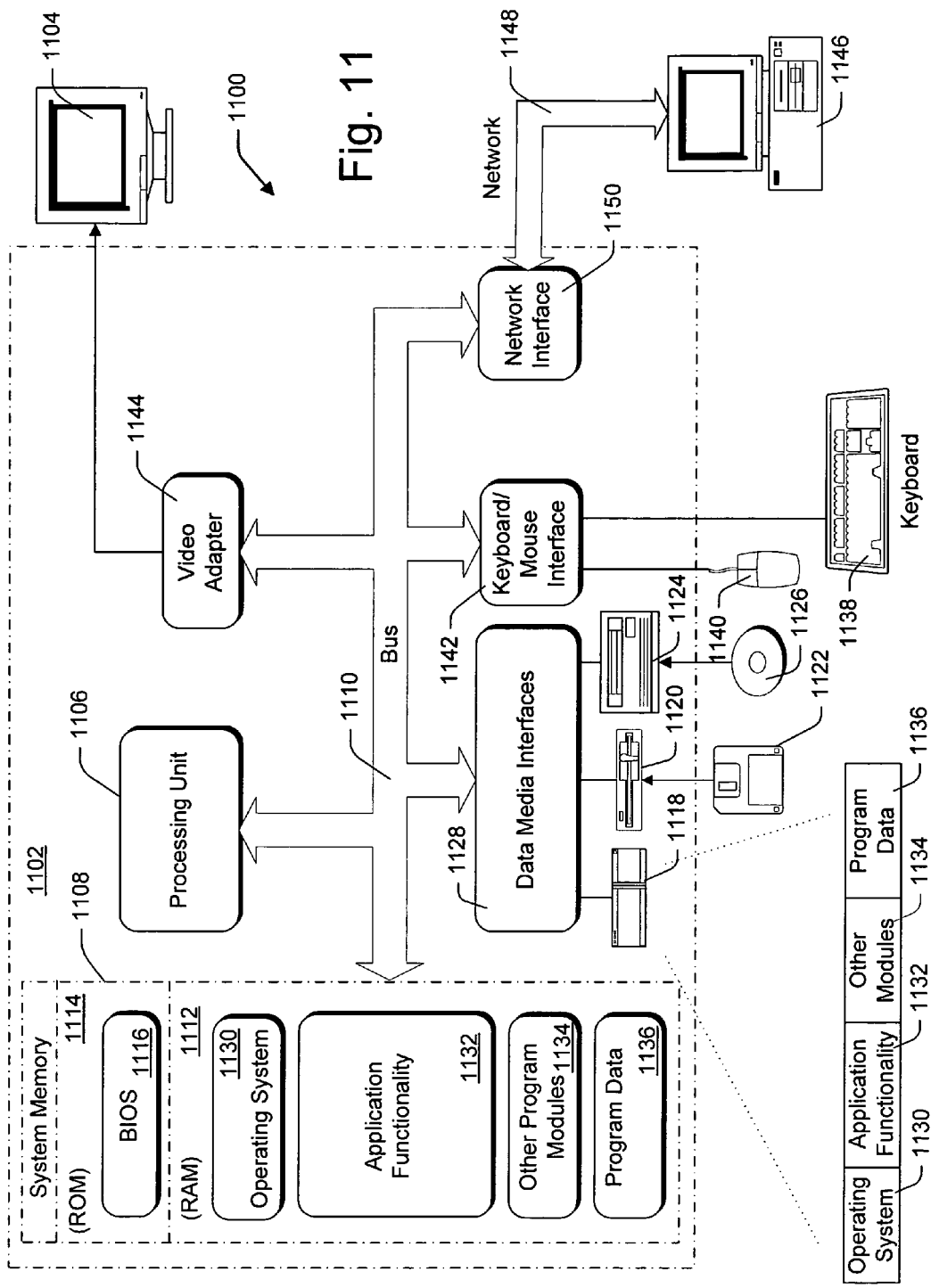

PROVISIONS FOR VALIDATING CONTENT USING A CONTENT REGISTRATION AUTHORITY

TECHNICAL FIELD

This subject matter relates to strategies for validating information-bearing content. In a more specific exemplary implementation, this subject matter relates to strategies for validating content received over a network for use in an instant messenger application.

BACKGROUND

An instant messenger (IM) application enables real time communication among online participants. By way of background, an IM application typically includes functionality for allowing an IM user to define a group of participants with whom the user frequently communicates. After defining such a group, the IM application typically notifies the IM user when any member of the group happens to be online. The IM user then has the option of starting a communication session with one or more members of the group. Or the IM user might be contacted by another member who happens to be online. These events prompt the IM application to open a user interface (UI) pane that presents an evolving sequence of textual messages transmitted among IM conversation participants.

FIG. 1 shows an overview of a representative IM system 100. The system 100 includes a collection of client devices (102, 104, ... 106) connected together via a coupling mechanism 108 (e.g., the Internet). A user Alice (A) operates client device A 102, a user Bob (B) operates client device B 104, and a user Carol (C) operates client device C 106. FIG. 1 shows that client device A 102 provides a conventional user interface pane 110. The user interface pane 110 identifies Alice's friends in a contact list 112, and also identifies whether these buddies happen to be currently online. Assume that Bob and Carol are two members of Alice's contact list 112 who happen to be currently online.

In recent years, providers of IM applications have attempted to provide a more engaging user experience by adding supplemental features to the above-described basic IM functionality. For instance, Microsoft Corporation of Redmond, Wash. has developed an MSN Messenger application that includes various features that exhibit dynamic behavior (such as Messenger's "Winks" feature, etc.). These features may provide an animated vignette for presentation in an IM pane, or other kind of non-static presentation. To achieve this dynamic behavior, such content may contain executable instructions that command the client device to perform operations during runtime. Such content can be implemented in various ways, such as by Flash functionality developed by Macromedia, Inc. of San Francisco, Calif. Flash movies contain vector-based animation graphics, and may contain script-type instructions (ActionScript) embedded therein. (More specifically, Flash Player is the ActiveX control provided by Macromedia that that can be used to provide playback of Flash movies (e.g., .swf files) in an IM application.)

However, the incorporation of executable content into an IM application also introduces significant challenges. Namely, there is a risk that a user (or some other entity) may intentionally or unintentionally introduce malicious content into an IM system. For example, instead of merely controlling the presentation of an IM feature, the dynamic component of malicious content may improperly access files, install unwanted code, destroy system resources, activate undesired user interface presentations, activate webcam functionality, and so forth. Such malicious content may therefore cause great disruption and damage within an IM system, detracting from the otherwise engaging and desirable nature of dynamic content.

Indeed, while the threat of computer viruses poses a pernicious problem in any computer environment, the consequences of such viruses in an IM system may be particularly severe. This is principally due to the automatic manner in which IM applications propagate information among participants. For example, the propagation of a virus via an Email application often depends on a user taking the express step of activating executable content that accompanies the Email as an attachment. In IM applications, however, it is often desirable to automatically execute such content without the user's approval. A network of interrelated IM groups might therefore constitute a very susceptible conduit for the rapid spread of malicious content.

Consider, for example, the case in which Alice uses her client device A 102 to retrieve content 114 that happens to have a virus. For example, assume that Alice visits a website that provides a library of animated icons supplied by a content provider. Assume that Alice selects one of these animated icons and downloads it to her local client device A 102 for use in communicating with her buddies. For instance, Alice can adopt the downloaded animated icon as an integral part of the set of information that she provides to her buddies when communicating with them, e.g., such that, for instance, Bob will see Alice's animated icon when conducting an IM session with Alice. However, transfer of the animated icon will also transfer the virus along with it. Bob himself may then further automatically propagate the virus to all of the members on his contact list, and so on, possibly without these users being aware that they are conduits in the spread of the virus. The reader can readily appreciate that an IM application can therefore rapidly spread a virus through a very large pool of IM users. To provide a more specific idea of the magnitude of this problem, there are roughly 200 million MSN IM users today; it is conceivable that an executable content-borne virus could spread through such a group in a matter of hours.

The industry has provided numerous tools to reduce the risk of computer viruses. But these tools do not provide suitable safeguards in an IM application due to the above-identified characteristics of this kind of environment. That is, traditional anti-virus tools typically aim at generality, attempting to provide the most effective techniques for stopping the spread of viruses, regardless of the source of the content or the end-use application of the content. Traditional approaches typically go about this task by developing a very inclusive database of known malicious content. These approaches then compare a particular content item under review with this database, to determine whether the content item contains any viral content that matches information in this database. McAfee, Inc. of Santa Clara, Calif. is one well-known provider of virus protection services that maintains a large database of known malicious content. However, this body of malicious content constantly changes in response to the development and introduction of new forms of viruses. Thus, a consumer may encounter a virus before a traditional virus protection system has properly identified the virus and added it to its database of known malicious content. Since the consumer lacks safeguards against this new virus, the consumer may consume the virus, opening the consumer's computer resources up to whatever damage that the virus may inflict. Traditional systems cope with this problem by acting as quickly as possible to stem the further spread of such a virus. This approach—which implicitly accepts a limited amount of damage—may work sufficiently well in the context of traditional communication routes (such as Email). But, as explained above, an IM application is unique in its potential ability to very quickly propagate malicious content among users (without even requiring the active participation of the users). Hence, the "acceptable limited damage" paradigm might not provide satisfactory results for an IM environment, because, in fact, the damage may be neither acceptable nor limited.

A number of other solutions have been developed to mitigate the spread of viral content, but again, these solutions are not well suited for an IM application. Consider, for example, the system 200 of FIG. 2, which shows one well-known approach to protecting computers against attacks from malicious content. In this well-known scheme, a content publisher 202 constitutes any entity that is set up to download content 204 to a client device 206. In this example, the content publisher 202 can comprise a company (the fictitious "XYZ Corp.") that produces code for dissemination to a client device 206. For instance, the content publisher 202 may maintain a website that allows the user to download code upon the request of the user who wishes to purchase such code.

The content publisher 202 will wish to assure the user of the client device 206 that the code that the user is downloading is safe (e.g., that the code contains no viruses). It performs this task with the assistance of a certificate authority (CA) 208. VeriSign, Inc. of Mountain View, Calif. serves as one commonly used certificate authority. By way of overview, the purpose of a certificate authority 208 is to vouch for the identity of a publisher of content, much like a passport, issued by a government, vouches for the identity of a traveler. Namely, the content publisher 202 will typically furnish information to the certificate authority 208 that verifies its identity, and, in response, the certificate authority 208 issues a certificate that the content publisher 202 can offer to its customers as proof of its identity. In other words, the recipients are asked to trust the content due to the fact that it is "vouched for" by the certificate authority 208. FIG. 2 indicates that the XYZ Corp. content publisher 202 interacts with a fictitious Trusty Co. Inc. certificate authority 208. The online community has not mandated the use of a single (exclusive) certificate authority, so an online environment will typically provide several well-known authorities that can be used (e.g., as denoted in FIG. 2 by certificate authority 210, certificate authority 212, and so forth).

In a typical security procedure, the content publisher 202 will sign the content 204 with its private key. A signing operation comprises encrypting the content (or a digest of the content) with a private key. The signing entity then sends the signed content along with the certificate to a client device. The public key (which is the counterpart of the private key used to sign the content) is used by the client device to decrypt the encrypted content.

Upon receipt of the decrypted content, the client device 206 can examine the certificate to determine whether it originates from a trusted source. More specifically, a certificate may be linked to other certificates in a hierarchical chain of trusted relationships, reflecting a corresponding chain of entities that have vouched for the integrity of the content provider which disseminates the content. (Parts of the chain may be pre-installed on a client device as part of its core operating system functionality.) The client device 206 determines whether the received content can be trusted by "following" this chain up the hierarchy to determine whether it terminates in a certification authority that is trusted, such as, in this case, Trusty Co. Inc.

One well-known technology for facilitating the above-described process is Authenticode™ provided by Microsoft Corporation. Among other functions, Authenticode presents information, which, in conjunction with other enabling applications (such as Microsoft Corporation's Internet Explorer), can be used to provide a user interface (UI) presentation 214 that alerts the user to the fact that they are attempting to install a particular content item having certain characteristics. The UI presentation 214 may specifically identify the name of the program (i.e., the fictitious ABC program), the name of the content publisher 202 (i.e., XYZ Corporation), and the name of the certification authority 208 (i.e., Trusty Co. Inc.) that is ultimately vouching for the integrity of the content that has been received. The UI presentation 214 typically includes command buttons that prompt the user to decide whether they wish to install the content ("YES"), whether they wish to forego the installment ("NO"), or whether they require more information to make a decision ("More Info").

The above-described security paradigm is not ideal for the IM environment described in connection with FIG. 1. First, assume that an Authenticode-type UI presentation was presented to Bob to alert Bob to the animated icon that his friend, Alice, wants to invoke on his machine. Even if Bob was made aware of the content publisher who created the animated icon, it is quite possible that Bob would not have any insight into the trustworthiness of that entity. The UI presentation may also identify the certification authority which vouches for this company, but Bob may not have heard of that company either, or, if Bob knows of that company, this may be insufficient to allay his concerns regarding the trustworthiness of an otherwise unknown content publisher. In typical practice, a user may simply press "YES" in response to prompts of an Authenticode-type UI presentation because of a false sense of security associated with the fact that a trusted friend is sending him the content. This, of course, can lead to disastrous results for the receiving user and the IM system as a whole. Second, the type of intrusive UI presentation 214 shown in FIG. 2 may be distracting or cumbersome, and may be particularly inappropriate in an IM environment which attempts to create a casual, simple, and enjoyable user experience.

Finally, existing security provisions do not allow content providers and certificate authorities to effectively apply their services to achieve beneficial marketing objectives.

For at least the above-identified reasons, there is an exemplary need for more satisfactory strategies for validating content transferred over a communication channel, such as, but not limited to, a network that implements an IM application.

SUMMARY

According to one exemplary implementation, a method is described for facilitating the validation of content over a network. The method comprises registering content provided by a content provider at a content registration authority, based on a content identifier forwarded by a content provider. The registration of the content allows a client device which receives the content from the content provider to securely consume the content, based on an assumption that the content provider is entrusted by the content registration authority to provide the content, without prompting a user of the client device to explicitly approve the content itself or the content provider.

Additional exemplary implementations are described in the following.

BRIEF DESCRIPTION OF THE DRAWINGS

FIG. 11 shows an exemplary computer environment for implementing aspects of the systems shown in FIGS. 3-5.

Figure 1:
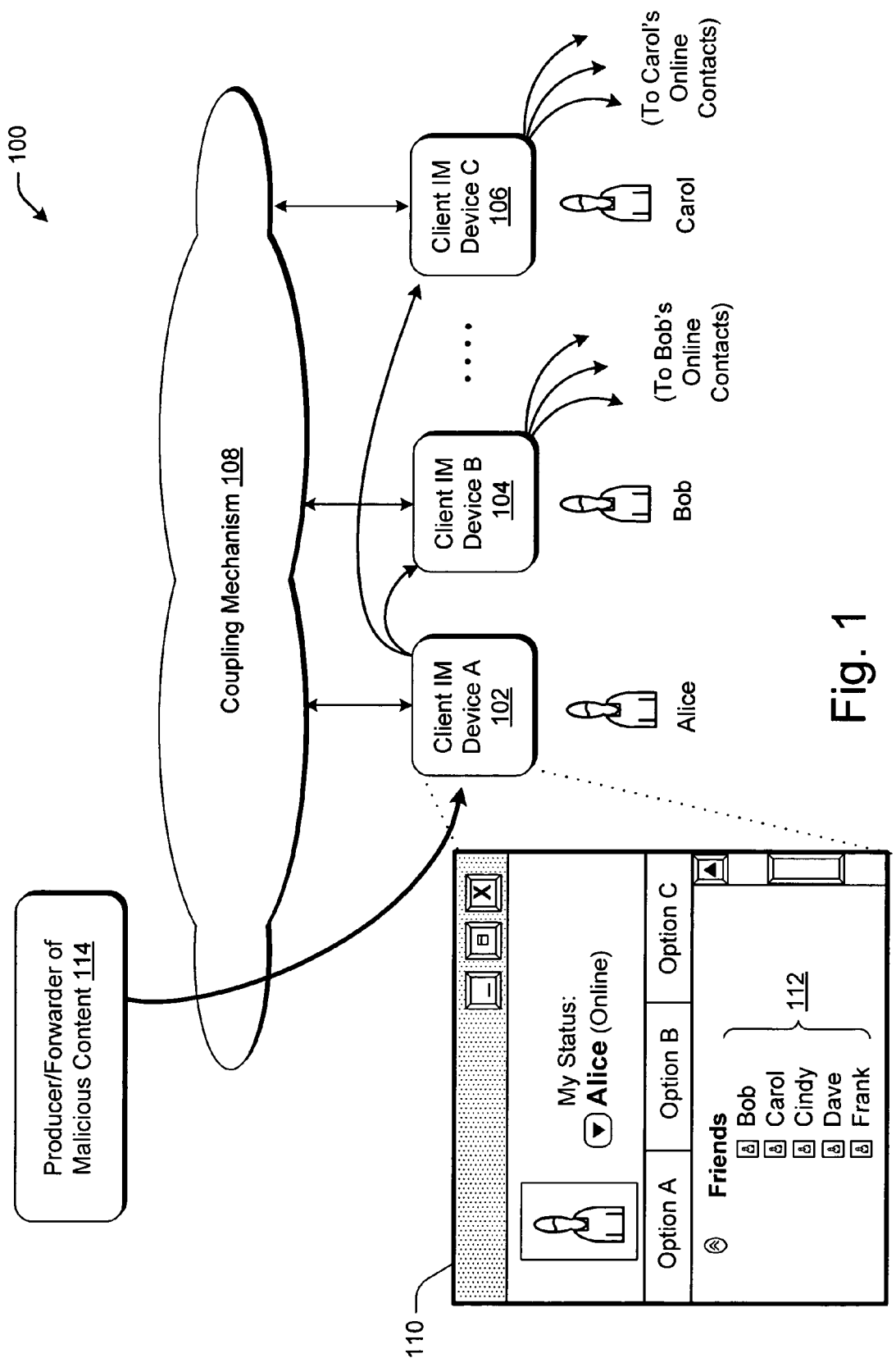
FIG. 1 shows a conventional IM application.
Figure 2:
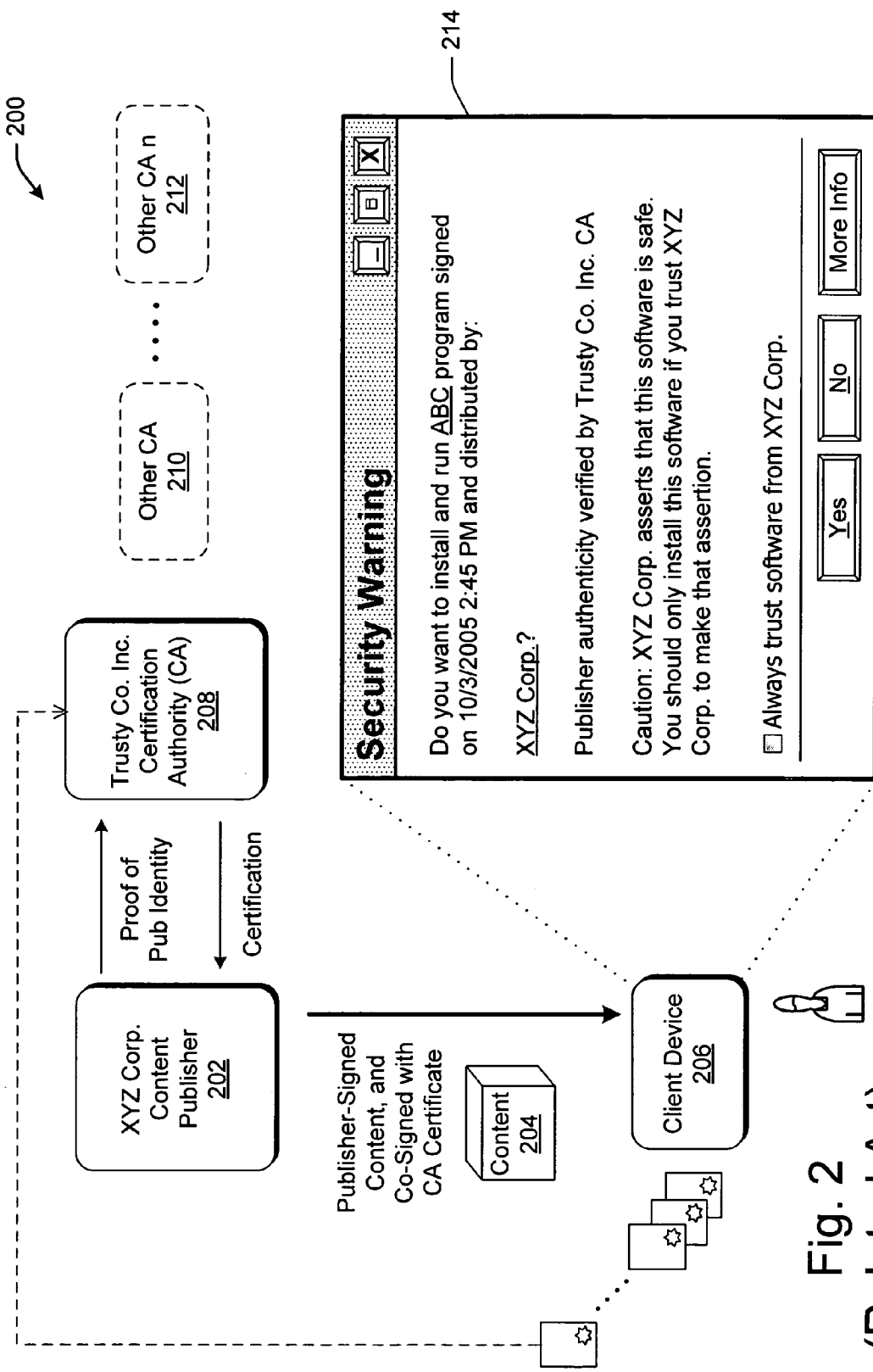
FIG. 2 shows a conventional security mechanism.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth strategies for validating content which is transferred over a communication channel using a more effective approach than heretofore provided in the art. A central content registration authority is provided which registers the content disseminated by one or more content providers to one or more client devices. A client device which receives registered content can securely consume the content, based on an assumption that the content provider that furnished the content is entrusted by the content registration authority to provide the content, and without prompting a user of the client device to expressly approve the content provider. In other words, validation proceeds in a transparent manner with respect to the providers of content (from the perspective of the receiving client devices), resting solely on the authority associated with the central registration authority.

According to a first solution ("solution A") described herein, registration may comprise forming a content identifier based on the content (e.g., a hash of the content), and then, at the content registration authority, forming a stamp based on the content identifier. A content publisher forwards the stamp along with the content to a client device. In this case, validation at the client device can comprise, in part, using the stamp to determine whether the integrity of the content is vouched for by the content registration authority.

According to a second solution ("solution B") described herein, registration may comprise storing the content identifier in a registration store maintained by the content registration authority. In this case, validation at the client device may comprise determining whether received content has a corresponding registered content identifier stored at the content registration authority.

According to another feature, the content comprises information that includes instructions, prompting a processor device to perform at least one operation. In a featured exemplary implementation, the content specifically comprises information for use in the context of an instant messaging (IM) application (but the functionality described herein is not otherwise limited to an IM application).

According to another feature, a number of business models can be predicated on the above-described use of the content registration authority. In one model, the content authority (or some other entity on behalf of the content authority) can transfer a host program to the client device. The above-described content can comprise information that is used in conjunction with the host program. For example, the host program can comprise an instant messenger application, and the content can comprise a Flash program which is used in conjunction with the instant messenger program. Or the host program can comprise a document editing program, and the content can comprise a document which can be manipulated by the document editing program, and so forth. In one business arrangement, the content registration authority transfers the host program to the client device free of charge, but requires a fee to be paid to receive the content that is used in conjunction with the host program.

More specifically, in the context of an IM application, an IM provider can furnish a core IM application to users (optionally free of charge). The IM provider can then establish its own registration authority, requiring that all third party publishers of content register their content with the IM provider's registration authority before transferring this content to consumers. The consumer can then automatically consume and propagate the content (optionally for a per item fee) based on the implicit trust built into the use of a central provider-sponsored registration authority. The IM provider's registration authority also can then serve as a central authority to revoke prior registration of content in a convenient manner. This business paradigm differs in character from other applications which are not concerned with the automatic execution of network-downloadable content in the context of a base communication-related application (e.g., a core IM application), wherein the content is potentially provided by a collection of trusted third parties (e.g., publishers of Flash files), and, upon downloading, can be readily transferred among peers for their automatic execution. For example, security provisions used to ensure the integrity of patches downloaded to a base application pertain to a different business paradigm, as this content originates only from the provider of the base application, and is not intended to be automatically consumed by the base application; nor can such patches be disseminated to other peer base applications for their automatic execution. Provisions used to ensure that only certain software products are run on a prescribed hardware platform are similarly not on point, as these provisions are often aimed at licensing objectives, not on ensuring the integrity of code in the unique type of network environment mentioned above that involves the automatic execution of content, and the possible revocation of that content through the network.

The strategies described herein confer a number of benefits. According to one benefit, the use of the content registration authority helps reduce the risk of malicious content quickly spreading through a network. This feature is therefore especially useful in instant messaging environments, where the communication channel is particularly vulnerable to the rapid dissemination of malicious content. More specifically, the registration-based validation scheme described herein is particularly effective in quickly terminating the propagation of malicious content, e.g., because a client device cannot consume or further propagate the content unless it passes the registration-based validation tests to be described.

According to another benefit, the validation at the client device does not require the user to expressly confirm whether he or she wishes to consume content from an identified content provider. This is advantageous because it frees the user from making a decision that the user is ill-equipped to make. A user may also wish to avoid making such a decision because such a confirmation process may be cumbersome and distracting. The use of pop-up UI confirmation dialogs is particularly inappropriate in instant messaging applications, as these applications strive to provide a simple user interface that can easily and intuitively be mastered by new users.

According to another benefit, business models can apply the registration-based validation scheme to provide new marketing paradigms, to the mutual benefit of the content registration authority, the content providers and the consumers of content.

Additional features and attendant benefits of the strategies will be set forth in this description. At the outset, while the security provisions are described herein in the illustrative case of an IM application, these security provisions can be used in the context of other applications.

As to terminology, the term "content" represents any kind of information expressed in any kind of format. The content may contain information that includes no executable component. This is typically the case, for instance, with image information that provides a static picture (e.g., which provides a static user icon tile for presentation in an IM application). Or the content may contain information that includes an executable component. An executable component performs some operation on processor functionality when the executable component is invoked. As described in the Background section, the downloading of content having an executable component is obviously of greater concern than content without such content, as the operations that the executable component invokes may intentionally or unintentionally cause damage to the receiving client device or the IM system as a whole (that is, if the virus is propagated to other client devices).

Wherever grammatically appropriate, the term "content item" or the term "piece of content" is used to refer to a particular piece of content, such as a particular program.

The term "register" and "registration" are intended to have broad connotation. In a first solution (A) described herein, registration can constitute simply creating a stamp using a content registration authority. The stamp accompanies the content itself as it is passed to the recipient client device. In this case, the content registration authority may not act as a central repository for registration information. Rather, a receiving client device confirms registration, in part, by tracing a chain of authorization entities (reflected in an associated chain of certificates) to the content registration authority. In a second solution (B), registration can comprise actually storing content identifiers within the content registration authority. In this case, the client device confirms registration by accessing the central registration authority.

This disclosure includes the following sections. Section A presents exemplary systems for implementing a registration-based validation scheme. Section B presents a series of flowcharts which describe the operation of the systems of Section A. Section C describes additional applications of the registration-based validation scheme. Section D describes an exemplary computer environment for implementing aspects of the systems of Section A.

Figure 4:
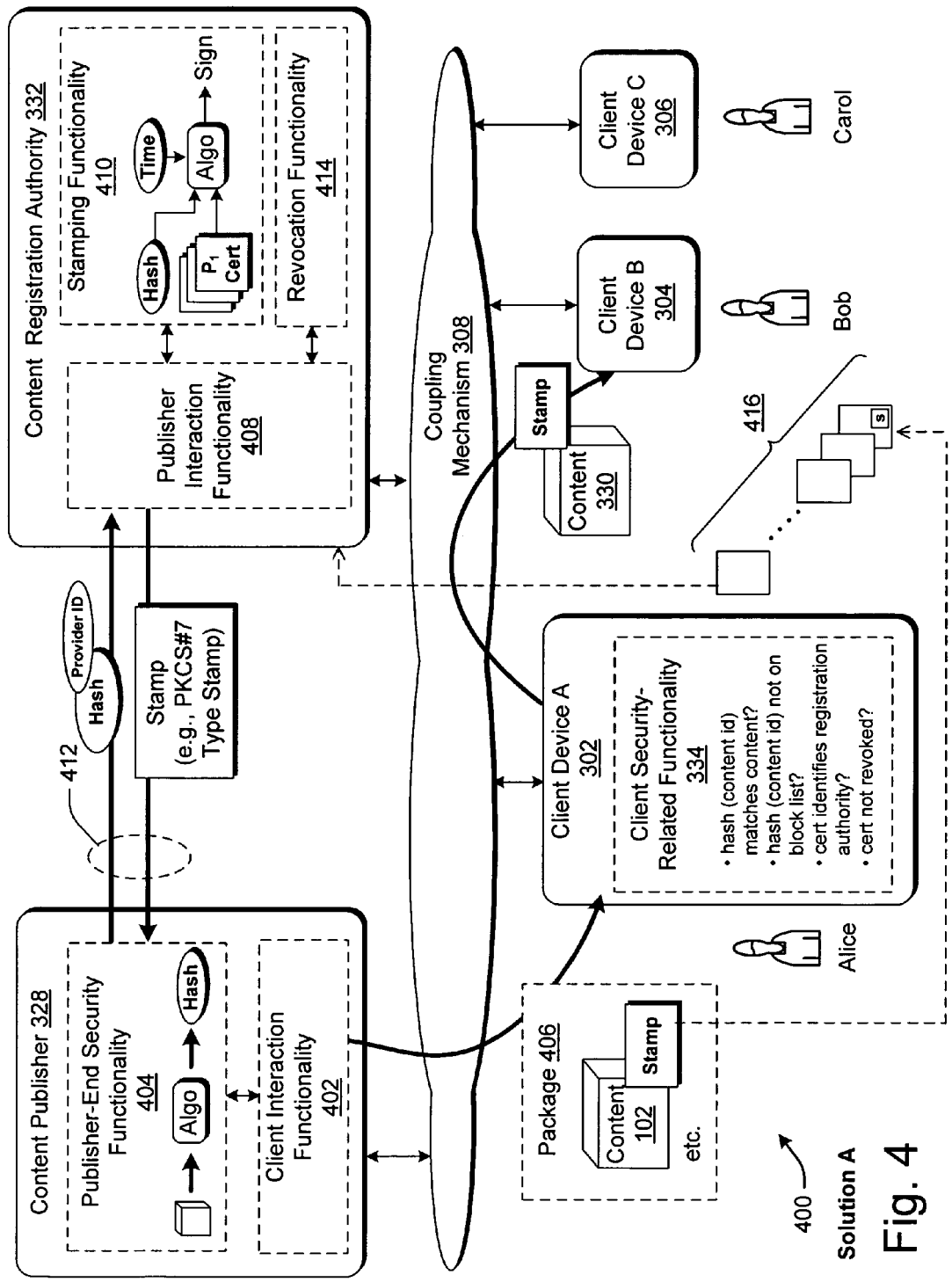
FIG. 4 shows an implementation of the system of FIG. 3 in accordance with a "solution A."
Figure 5:
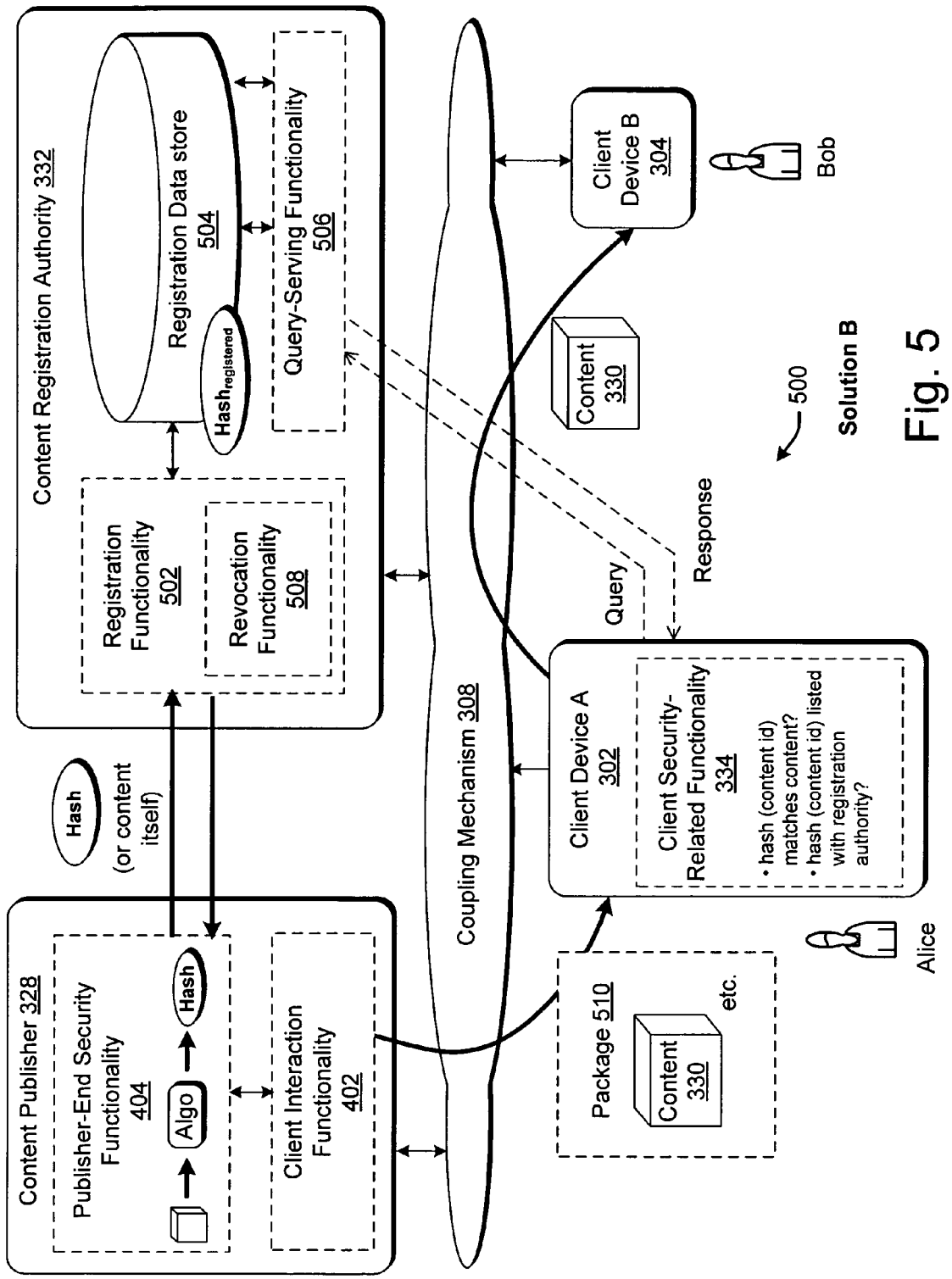
FIG. 5 shows an implementation of the system of FIG. 3 in accordance with a "solution B."

A. Exemplary Systems (FIGS. 3, 4 and 5)

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the term "logic," "module," or "functionality" represents program code (and/or declarative content, e.g., markup language content) that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. Overview of Exemplary Architecture

Figure 3:
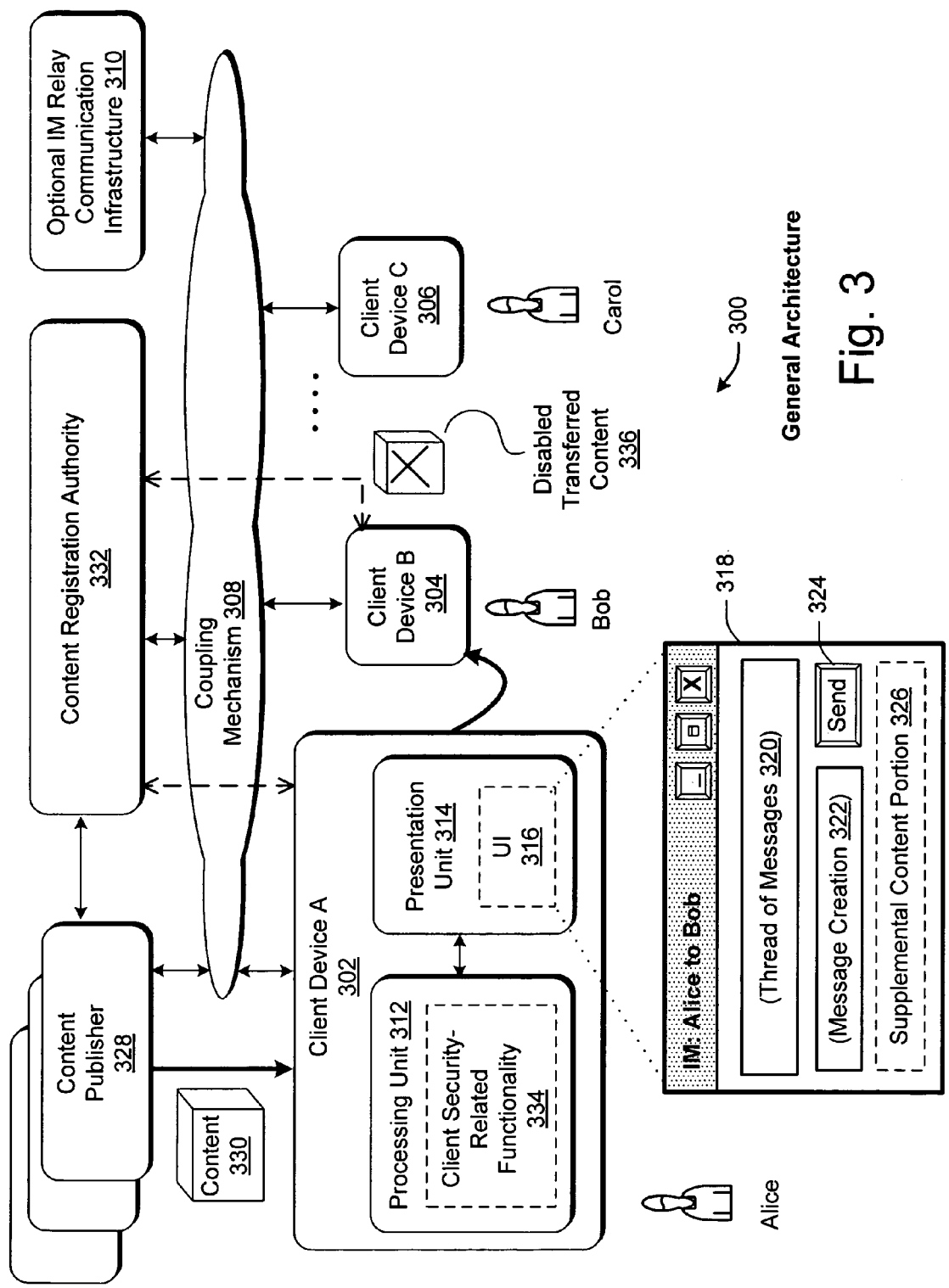
FIG. 3 shows an overview of a system that provides an improved security mechanism that relies on a content registration authority.

FIG. 3 shows one exemplary system 300 that can be used to implement the registration-based validation scheme summarized above. The system 300 includes a collection of client devices (302, 304, . . . 306) coupled together via a coupling mechanism 308. The system 300 can provide optional relay infrastructure 310 (such as switchboard services) for connecting participants of an IM conversation together via the coupling mechanism 308.

The coupling mechanism 308 can comprise any mechanism or combination of mechanisms for coupling the components of the system 300 together. For instance, the coupling mechanism 306 can include any kind of network (or combination of networks), such as a wide area network (e.g., the Internet), an intranet, Digital Subscriber Line (DSL) network infrastructure, point-to-point coupling infrastructure, and so on. The coupling mechanism 308 can use or involve any kind of protocol or combination of protocols, such as the Internet Protocol (IP), the Transmission Control Protocol (TCP), the User Datagram Protocol (UDP), the HyperText Transfer Protocol (HTTP), the Simple Object Access Protocol (SOAP), and many potential others. In the case where one or more digital networks are used to disseminate information, the coupling mechanism 308 can include various hardwired and/or wireless links, routers, gateways, name servers, and so on (not shown).

In one case, the devices (302, 304, . . . 306) can communicate with each other via a peer-to-peer (P2P) arrangement, which may not require the services of the relay infrastructure 310. In another case, the devices (302, 304, . . . 306) can communicate with each other via switchboard services and other functionality provided in the relay infrastructure 310. In another case, the devices (302, 304, . . . 306) can communicate with each other using a combination of P2P and switchboard services.

If provided, the relay infrastructure 310 can comprise any combination of equipment for providing services to the client devices (302, 304, . . . 306). For instance, the relay infrastructure 310 can comprise one or more server machines (e.g., a server farm) for providing services to the devices (302, 304, . . . 306), as well as one or more associated databases, and so forth. The components of the relay infrastructure 310 can be located at a single site or distributed over plural sites.

Each client device (302, 304, . . . 306) can include any kind of equipment for interacting with other components of the system 300. In one exemplary case, the client devices (302, 304, . . . 306) can correspond to personal computer devices, personal digital assistant (PDA) devices, intelligent mobile phone devices, any kind of transportable or wearable computer device, any kind of game console device (such as Microsoft Corporation's Xbox™ game consoles), and so forth. Where the client devices (302, 304, . . . 306) are implemented by some kind of computer device, FIG. 11, to be discussed in turn, provides one exemplary computer environment for implementing such a device. In the illustrative case of FIG. 3, the user Alice (A) interacts with client device A 302, user Bob (B) interacts with client device B 304, and user Carol (C) interacts with client device C 306.

FIG. 3 shows that representative client device A 302 includes a processing unit 312 coupled to a presentation unit 314. The processing unit 312 comprises any data processing functionality for performing various ascribed tasks (such as one or more CPUs), while the presentation unit 314 provides any kind of output mechanism by which a user (i.e., Alice) can interact with the processing unit 312. The presentation unit 314 can provide visual output, audio output, tactile output, any combination of such outputs, and so forth.

The presentation unit 316 can present various user interface (UI) presentations 316. In an IM application, for instance, one such UI presentation is a dialog pane 318. In this scenario, the pane 318 indicates that the user Alice is conversing with the user Bob. A typical dialog pane 318 includes a message log box 320 which provides a record of the messages exchanged in the course of an ongoing conversation. The dialog pane 318 also includes a message creation box 322 for composing a message prior to transmission to a target recipient. The dialog pane 318 also includes a send command button 324 that prompts the IM application to transmit the message in the message creation box 322 to the target recipient, whereupon this message will appear in the message log box 320. Finally, the dialog pane 318 can include supplemental content portion 326. The supplemental content portion 326 may provide static content (which does not change) or dynamic content (which does change). In other words, dynamic content is content that "does something." Such dynamic portions, for instance, can include animated icons, video vignettes, and so forth. The position of the supplemental content portion 326 shown in FIG. 3 is merely representative, in an abstract way, of the inclusion of such subject matter anywhere in the dialog pane 318; in fact, the supplemental content portion 326 can appear anywhere in the dialog pane 318.

Content that implements the supplemental content portion 326 of the dialog pane 318 can originate from one or more content publishers. Assume, for the purposes of discussion, that the content that supplies the supplemental content portion 326 originates from a particular content publisher 328. Namely, the content publisher 328 can distribute content 330 in response to the user's (i.e., Alice's) payment of a fee, or in response to a non-fee event. (The content publisher 328 is referred to as a "third party" in the sense that it is neither the provider of the IM application itself nor the client user.)

As mentioned above, a principal objective of the system 300 is to prevent any entity from introducing malicious content into the system 300, e.g. via any content provider (e.g., provider 328), any client device (302, 304, . . . 306), and so forth. To this end, the system 300 makes use of a content registration authority 332. Broadly stated, the content registration authority 332 registers the content published by the content publisher 328. The registration performed by the content registration authority 332 provides a central reference point against which the integrity of the content 330 disseminated by the content publisher 328 can be assessed. That is, upon receiving the content 330, the receiving client device (e.g., client device A 302) can consult information supplied by the content registration authority 332 to determine whether the content 330 can be trusted. If so, the receiving client device A 302 can store (and optionally install) the content 330 for subsequent use in the IM application. This allows the receiving client device A 302 to consume the content itself, as well as transfer it to other client devices for their consumption (after independent validation of the content at those other client devices).

Different systems can implement the content registration authority 332 in different ways. These different implementations reflect different overall security strategies provided by the system 300, referred to as "solutions" herein. This disclosure features two exemplary security solutions, referred to as solution A and solution B, associated with different implementations of the content registration authority 332. These solutions are exemplary and non-limiting, meaning that additional solutions are possible.

In security solution A, the content registration authority 332 receives a content identifier from the content publisher 328. The content identifier represents the content 330. In one case, the content publisher 328 can form the content identifier by providing a digest of the content 330, such as a hash of the content 330. Upon receipt of the content identifier, the content registration authority 332 forms a so-called stamp by signing a message that includes the content identifier (to be described in greater detail below). The content registration authority then returns this stamp to the content publisher 328. The content publisher 328 forms a package that includes at least the stamp and the content itself. The content publisher then forwards this package (e.g., as a cabinet file, or some other format) to the receiving client device A 302. On the basis of the stamp in the received package, the client device A 302 can validate the content 330. One test performed in validating the content 330 involves determining whether the message in the stamp was indeed signed by the content registration authority 332 (to be described in greater detail below). This can be performed by following a hierarchy of linked certificates associated with different authorities involved in "vouching for" the content 330. Another test performed in validating the content 330 involves determining whether the message contains an accurate content identifier for the content 330 that accompanies it in the distributed package (to be described in greater detail below). If this test (among other tests to be described below) passes, the client device A 302 can assume that the content 330 is trustworthy, regardless of the specific identity of the content publisher 328 used to furnish the content 330. The client device A 302 can then safely consume the content 330 by storing (and possibly installing) it. Such content 300 may implement the above-identified supplemental content portion 326 of the dialog pane 318. The client device A 302 can also forward the content 330 and associated stamp to another client device, such as client device B 304. Client device B 304 can then verify the integrity of the content 330 in the same manner described above with respect to client device A 302. Subsection A.2 (below) provides additional details regarding solution A.

In security solution B, the content registration authority 332 can again receive a content identifier from the content publisher 328. And again, the content publisher 328 can form the content identifier by computing a digest of the content 330, such as a hash of the content 330. Upon receipt of the content identifier, the content registration authority 332 can store the content identifier in a registration data store, thereby effectively registering the content identifier. The content publisher 328 can then transfer the content 330 to the client device A 302. To verify the integrity of the content 330, the client device A 302 can independently compute the content identifier of the received content 330, e.g., by forming a hash of the received content. The client device A 302 can then use the computed content identifier as a key to determine whether the content has been previously registered in the registration data store of the content registration authority 332. If this test (among other tests to be described below) passes, the client device A 302 assesses that the content 330 is trustworthy, regardless of the specific identity of the content publisher 328 used to furnish the content 330. The client device A 302 can then safely consume the content 330 by storing (and possibly installing) it. The client device A 302 can also forward the content 330 to another client device, such as client device B 304. Client device B 304 can then verify the integrity of the content 330 in the same manner described above with respect to client device A 302, that is, by separately accessing the content registration authority 332 to determine whether a content identifier corresponding to the received content 330 is registered in the registration data store. Subsection A.3 (below) provides additional details regarding solution B.

The above-described solutions can be altered in various respects. For example, in both solutions, the content publisher 328 itself forms the content identifier (e.g., by taking the hash of the content 330). However, in an exemplary variation, the content publisher 328 can forward the content 330 itself to the content registration authority 332, and the content registration authority 332 can form the content identifier. Further, solution B was described as requiring the registration of the content prior to its dissemination to the client device A 302. However, in an exemplary variation, the client device A 302 can first receive the content 330, and then, before use, register it with the content registration authority 332. To ensure the security of this alternative implementation, the content publisher 328 can sign the content identifier with its own private key. This signed content identifier can then be transferred to the client device (much like a stamp). The client device can then submit the signed content identifier to the content registration authority 332. The content registration authority 332 can then check the signature to ensure that it originates from a trusted partner. If the signature is deemed trusted, the content identifier can be added to the registration data store.

As described above, the term "registration" has a slightly different connotation in the context of solution A compared to solution B. In solution A, the content 330 is registered by the content registration authority 332 in the sense that the content registration authority 332 processes it to supply a stamp. In this approach, the content registration authority 332 does not need to maintain the stamps in a central store, but the stamps otherwise act as links which, in a sense, refer back to the registered status conferred by the content registration authority 332. In solution B, the content 330 is registered in a more literal sense of storing content identifiers (which represent the content 330) in a central repository maintained by the content registration authority 332. Then, the client devices (302, 304, . . . 306) can query this store to determine the trustworthiness of content that they receive prior to their consumption of the content.

As will be described, both solutions allow the content registration authority 332 to revoke the registration of a single piece (or batch of) content. Revocation is a useful feature in view of the characteristics of the business environment represented by the system 300. Namely, in one implementation, the content publishers 328, rather than the content registration authority 332, produce the content 330 distributed to client devices. If a publisher is considered a trusted partner (e.g., because it has a pre-established business relationship with the entity administering the content registration authority 332), then the content registration authority 332 can accept any registration request from this partner. There is nevertheless a risk that the partner could intentionally or unintentionally submit malicious content to the content registration authority 332 (e.g., because the partner indeed has malicious intent or because the partner has somehow been "hacked"). Moreover, there is the risk that the content registration authority 332 itself can be "hacked" and thereby tricked into signing questionable content. Therefore, there exists a need for mitigating the kinds of damage that these attacks can cause.

In solution A, the certificate used to sign the stamp for the compromised piece of content can be revoked. This causes the certificate chain validation to fail when the stamp is verified. This has the downside of revoking all content items having stamps generated with this certificate. This drawback can be mitigated by operational procedures used by the content registration authority 332 that limit the application of any particular certificate; namely, the content registration authority 332 can use different certificates for each trusted partner, and these certificates can also be changed on a regular basis.

Solution A can also rely on the use of block (rejection) lists to invalidate content. Namely, a content identifier for a revoked content item is added to a block list that a client device receives from the IM network (e.g., at sign in). The client device enforces the block list whenever it validates content by determining whether a particular content item that it has received is identified in the block list. That is, if the content item is listed on the block list, validation fails, even if other components of the validation test pass.

In solution B, revocation is more straightforward. Namely, the content registration authority 332 can remove (or invalidate) a malicious content item in its registration data store. If a security concern is assessed as particularly severe, the content registration authority 332 can remove (or invalidate) all content that a publisher has submitted within a specific time window.

Whatever solution is used, the client-side functionality used to enable the validation of the content is referred to as client security-related functionality 334. The client security-related functionality 334 is assigned the task of interpreting the contents of information received from the content publisher 328, validating the content 330 based on the stamp associated therewith (for solution A) or based on access to the registration data store (for solution B), and so forth.

The following subsections (A.2, A.3) delve into solutions A and B in greater depth. Before then, a few salient aspects of the system will be summarized as follows (pertaining to both solution A and solution B).

First, through the unique solutions described herein, client devices (302, 304, . . . 306) can assess the trustworthiness of the content 330 based solely on information furnished by the content registration authority 332. That is, the present solutions take the approach that an endorsement by the content registration authority 332 conveys that the client devices (302, 304, . . . 306) are dealing with a trustworthy content publisher. But it is not otherwise necessary for the client devices (302, 304, . . . 306) to separately examine the identity of the content publisher itself. The dashed vertical lines in FIG. 3 illustrates that the content registration authority 332 is the final arbiter in making validation decisions within the system 300, not the content publisher 328. This also means that the participating content publishers have agreed to let the central content registration authority 332 serve as the focal point of authorization, instead of, as in prior techniques, the content publishers themselves. (For instance, in prior techniques, the content publisher signed the content themselves using their own respective private keys; in the present solutions, the publishers need not perform this activity).

Stated in another way, prior techniques provide a decentralized approach, providing a mechanism by which many content publishers can obtain certificates from a variety of verification authorities. The certificates are used by the content publishers to sign their content before distributing it to consumers. The purpose of the publisher-based signing scheme is to arm the end user consumer with information that the consumer can use to make an intelligent decision regarding the integrity of a particular piece of received content (based on a consideration of the trustworthiness of the content publisher and the verification authority which has vouched for the content publisher). Prior techniques also aimed at broad applicability, attempting to provide a viable solution for any kind of content being disseminated and any kind of end use scenario within a diverse body of computer users. In the present solution, the content publishers defer to a central content registration authority to sign their content, and the purpose of this improved scheme is not to arm the consumer with information regarding trusted sources, but to enable the consumer to regard the content as implicitly originating from some trusted source. Moreover, in one exemplary implementation, the present technique is focused on a specific application (e.g., the IM application or like application) with specific demands and expectations, not a diverse and general-purpose online community of users consuming content in different contexts.

The above-described imputed trust is enforced in those exemplary cases where the entity that administers the content registration authority 332 is the same entity which provides a base application (e.g., the IM application) that is used to consume the supplemental content 306 (e.g., where Microsoft Corporation administers both the content registration authority 332 and the MSN Messenger network used to provide the dynamic content 306).

Second, and as a consequence of the above feature, the present above-described solutions do not need to provide a user interface (UI) presentation which alerts the user to the identity of the content publisher, and then asks the user to make a decision regarding whether this publisher is trustworthy (as is the case in the Authenticode™ product). This is beneficial because, in an IM environment, a user might very well have a difficult time making a decision regarding the trustworthiness of a content source (because, due to the proliferation of possible sources, the user is very likely to have little information regarding the sources). Such difficultly may lead the user to make an inappropriate approval of malicious content. Further, in an IM environment, the display of a security-related UI interface runs counter to its overall design philosophy (that is, of providing a simple, intuitive, and enjoyable user experience). In the present solutions, the client devices (302, 304, . . . 306) can automatically validate the content received from a content publisher without requiring cumbersome and distracting interaction with the user.

Third, the use of the registration-based validation solutions is particularly apt in IM applications, as it reduces the risk of quickly propagating viruses within the network. Namely, there is a potential that a user can "hack" into an individual client device to introduce malicious content in that local context. But when this malicious content is transferred to another client device, that other client device will invoke the registration-based validation scheme (e.g., by examining the stamp associated with the content, or by accessing its counterpart registered content identifier in the content registration authority 332). For the case of malicious content, these validation checks will fail, thus terminating the spread of a virus. Feature 336 in FIG. 3 (comprising an X'ed-out content symbol) illustrates the operation of the registration-based validation scheme in thwarting the spread of malicious content.

Fourth, the use of the content registration authority 332 accommodates new business models for disseminating content to client devices, as will be the topic of Section C below.

Fifth, the content registration authority 332 provides novel ways of managing content publishers 328. For instance, the system 300 is configured to rely on the cooperative interaction between the content registration authority 332 and trusted content publishers 328. It is possible, however, that some of the content publishers 328 may deliberately or unwittingly submit malicious content to the content registration authority 330. Nevertheless, the contractual relationship between the content registration authority 332 and the content publishers 328 can allow the content registration authority 332 to effectively police the activities of the content publishers 328, e.g., by restricting, suspending, or outright terminating their participation in the program. Since the content publishers 328 likely have a vested financial interest in continuing to supply content in the context of the program, they will take steps to ensure the integrity of the content that they submit to the content registration authority 332. Stated in another way, the balance of risks in the program provides incentives for the safe production and dissemination of content by the content publishers 328.

Sixth, in the event that malicious content is submitted, the content registration authority 332 provides revocation strategies for effectively disabling that content, or mitigating the damage that the content can cause in the IM network.

A.2. Solution A: Associating Stamps with Content

FIG. 4 shows a system which implements Solution A identified above. To repeat, solution A uses the content registration authority 332 to provide a stamping service. The stamps accompany the content 330 that is passed down from the content publisher 328 to the client device A 302. The individual features shown in FIG. 4 will be described in additional detail below. Basic elements already introduced in the context of FIG. 3 share the same reference numbers as FIG. 3.

Beginning with the content publisher 328, this component includes client interaction functionality 402 in cooperative engagement with publisher-end security functionality 404. The assigned names are suggestive of the roles played by these functional parts. Namely, the client interaction functionality 402 provides a front end for use in interacting with client devices (302, 304 . . . 306). For instance, the client interaction functionality 402 can constitute functionality for providing a website with which a user (e.g., Alice) may interact using a client device (e.g., client device A 302). The user can purchase content (e.g., programs, images, etc.) via this website.

The publisher-end security functionality 404 performs security-related tasks. For instance, as indicated by the flow of symbolic information in the depiction of this functionality 404 in FIG. 4, this functionality 404 can create a content identifier for the content 330 by forming a one-way hash of the content. One exemplary algorithm that can be used for this purpose is the known SHA1 algorithm (i.e., the Secure Hash Algorithm 1 developed jointly by the National Institute of Standards and Technology and the National Security Agency), although other types of algorithms can also be used (such as the MD5 algorithm, etc.). A "one-way hash" refers to a hash operation in which the result of the hash cannot be used to discern the original content used to produce the hash. Forming the hash effectively produces a digest of the content. In one operation, the content registration authority 332 can perform operations on the content identifier, rather than original content 330.

Another function performed by the content publisher 328 is to combine the content 330 with the stamp provided by the content registration authority 332 in a package 406 (along with potentially other metadata). For instance, the package 406 can be expressed as a cabinet file, or any other kind of file. The package 406 may include a manifest (not shown) which enumerates its contents. The content publisher 328 uses the package 406 to transmit the content 330 to the client device A 302.

In terms of physical implementation, the content publisher 328 can be implemented as one or more server components, databases and/or other hardware. The components of the content publisher 328 can be located at a single site, or spread over plural sites in distributed fashion. In one exemplary case, for instance, the client interaction functionality 402 can be implemented as one or more servers in a first collection of servers, and the publisher-end security functionality 404 can be implemented as one or more servers in a second collection of servers. The components of the content publisher 328 can be administered by a single entity or plural entities. FIG. 11 below shows one exemplary computer environment that can implement any server machine described herein.

Now turning to the content registration authority 332, this feature includes publisher interaction functionality 408 in cooperative engagement with stamping functionality 410. As the name suggests, the publisher interaction functionality 408 is used to interact with the content publisher 328. To function in this role, the system 400 preferably uses a secure channel 412 to couple the content publisher 328 with the content registration authority 332. Security can be achieved through any one a number of known mechanisms, or a combination of known mechanisms, such as by performing mutual Secure Socket Layer (SSL) authentication, providing private-public key encrypting/decryption between a particular content provider 328 and the content registration authority 332, using various IP filters to regulate access, and so forth. Namely, one strategy is to map the certificate used by a partner content publisher when accessing the registration authority to a provider ID that the partner specifies in their request. That is, if a partner identifies itself as ProviderA, then an SSL certificate that this partner uses to connect to the content registration authority 332 must match the certificate that the authority 332 expects to receive from ProviderA.

In one case, the content publisher 328 and the content registration authority 332 can exchange messages with each via Simple Object Access Protocol (SOAP), although other protocols can be used. For instance, a SOAP message from the content publisher 328 to the content registration authority 332 can include a body that contains at least a first XML-expressed element that identifies the content identifier (e.g., the hash), as well as a second XML-expressed element that identifies a provider ID (which identifiers the content publisher 328).

An exemplary request format is provided as follows:

```
----- SAMPLE REQUEST ------
  POST http://sam-ss931.msgr-tst.com/SS/hashsignerimpl.asmx
  HTTP/1.1
User-Agent: Mozilla/4.0 (compatible; MSIE 6.0; MS Web Services
Client Protocol
1.0.3705.0)
Content-Type: text/xml; charset=utf-8
SOAPAction: "http://messenger.msn.com/ws/2005/03/mcpr/Sign"
Content-Length: 394
Expect: 100-continue
Proxy-Connection: Keep-Alive
Host: sam-ss931.msgr-tst.com
<?xml version="1.0" encoding="utf-8"?>
<soap:Envelope
xmlns:soap="http://schemas.xmlsoap.org/soap/envelope/"
         xmlns:xsi="http://www.w3.org/2001/XMLSchema-instance"
         xmlns:xsd="http://www.w3.org/2001/XMLSchema">
    <soap:Body>
      <Sign xmlns="http://messenger.msn.com/ws/2005/03/mcpr/">
        <hash>GhueidMx/TR2EWyAfddTWJUG5K58=</hash>
        <providerId>ClientUserId</providerId>
      </Sign>
    </soap:Body >
</soap:Envelope >
```

The stamping functionality 410 can comprise any mechanism for transforming the received content identifier into a stamp which will accompany the content 330 to the recipient client device A 302. In one exemplary and non-limiting case, the stamping functionality can use PKSC #7-related technology to form the stamp, developed by RSA Data Security, Inc. of Bedford, Mass. For background information regarding this format, note, for example, "PKCS #7: Cryptographic Message Syntax Standard," RSA Laboratories Technical Note, Version 1.5, revised Nov. 1, 1993. However, the use of PKCS #7 is merely exemplary; the content registration authority 332 can use other encryption standards besides PKCS #7.

The stamp can include a number of fields, including, but not limited to: the content identifier itself (e.g., the hash); a timestamp which provides information regarding when the stamp was created (e.g., for use in retiring/revoking the stamp); a signature of the content identifier and timestamp information; an associated certificate associated with the signature, and so forth. FIG. 4 symbolically illustrates the production of the signature. The signature is formed by first selecting a certificate corresponding to the content publisher 328 which provided the content (e.g., $P_1$ Cert). To provide the signature, a private key associated with the $P_1$ Cert certificate is used to encrypt a combination of the content identifier (the hash) and the timestamp information.

The content registration authority 332 also includes revocation functionality 414 for revoking stamps issued by the content registration authority 332. Revocation of stamps can be performed in the manner described above, e.g., by revoking certificates used to produce the stamps. In the case where particular content providers are associated with particular certificates, revocation can be confined to only those content providers that have authored malicious content. Certificates can also be changed on a regular basis to limit the reach of a certificate revocation. To implement revocation, each signing certificate can be configured to indicate the location where Certificate Revocation List (CRL) information that governs that certificate can be obtained. The client device can then retrieve (e.g., download) the CLR information from the specified location when validating the stamp. Alternatively, the content registration authority 332 can forward CRL information to the client devices (302, 304, . . . 306) in the stamps, where such information prevents the subsequent validation of effected content by the client devices (302, 304, . . . 306). Content can also be disabled through the dissemination of block lists to the client devices (302, 304, . . . 306).

The publisher interaction functionality 408 can forward the thus-formed stamp to the content publisher 328 using different kinds of protocols, such as the SOAP protocol. The stamp can include, for example: the content identifier (the hash); timestamp information; the signed hash and time information; and provider ID information, etc. The publisher interaction functionality 408 preferably uses secure channel 412 to receive information from the content publisher 328.

One exemplary format of a SOAP-formatted response is provided as follows:

```
------ SAMPLE RESPONSE ------
HTTP/1.1 200 OK
Via: 1.1 TKSMDPRXY01, 1.1 TKSMDPRXY02
Content-Length: 2882
Date: Wed, 02 Feb 2005 16:00:37 GMT
Content-Type: text/xml; charset=utf-8
Server: Microsoft-IIS/6.0
X-Powered-By: ASP.NET
P3P:CP="BUS CUR CONo FIN IVDo ONL OUR PHY SAMo TELo"
X-AspNet-Version: 1.1.4322
Cache-Control: private, max-age=0
<?xml version="1.0" encoding="utf-8"?>
<soap:Envelope
xmlns:soap="http://schemas.xmlsoap.org/soap/envelope/"
         xmlns:xsi="http://www.w3.org/2001/XMLSchema-instance"
         xmlns:xsd="http://www.w3.org/2001/XMLSchema">
   <soap:Body>
      <SignResponse
    xmlns="http://messenger.msn.com/ws/2005/03/mcpr/">
         <SignResult>MIIH...</SignResult>
      </SignResponse>
   </soap:Body>
</soap:Envelope>
```

The processing of the received package 406 proceeds along the lines summarized with respect to FIG. 3. Namely, the client security-related functionality 334 retrieves the content 330 and its associated stamp from the package 406, and validates the content 330 based on the stamp. More specifically, validation comprises plural tests performed by the client security-related functionality. A first test comprises separately computing the hash of the received content 330, and determining whether the calculated hash agrees with the hash information contained in the package 406. A discrepancy in the two hash values indicates that the content 330 has been modified, possibly by injecting a virus in it.

A second test comprises determining whether certificate information associated with the stamp ultimately "points to" the content registration authority 332. This test can specifically entail tracing a hierarchical chain 416 of certificates (starting with the certificate included in the stamp) to determine whether it ultimately points to the content registration authority 332. Parts of the hierarchical chain 416 can be provided by the client device A 302 as part of its core functionality. In another words, the first certificate in the chained search is the certificate specified in the stamp. The last certificate in the chained search should correspond to the certificate that the client device is coded to accept (as a "trusted root"). The operating system of the client device provides functionality to follow the chain and ensure its validity.

A third test comprises determining whether the content has been revoked. More specifically, recall that the stamping functionality 410 provides stamps using provider ID-specific key information. Further, the stamping functionality 410 only issues a limited amount of stamps using a particular provider certificate before changing the certificate (and associated key information). Because of these features, the revocation functionality 414 can revoke a limited number of stamps. One way of implementing revocation is through well-known PKI methods. For instance, a certificate can be revoked by placing it on a Certificate Revocation List (CRL). The client security-related functionality 334 can be configured to check the CRLs for all CAs in the chain as part of the validation procedure. If any certification in the chain is revoked, then validation fails. Another way of testing whether the content remains valid is to determine whether its content identifier is absent from the block list (as described above).

A more drastic way of disabling third party content is to entirely deactivate the supplemental features provided by such content, e.g., as described in the commonly assigned U.S. patent application Ser. No. 11/060,211, entitled, "Systems and Methods for Shielding an Identified Vulnerability," naming the inventors Cesare J. Saretto et al., filed on Feb. 17, 2005, which is incorporated by reference herein in its entirety.

A fourth test comprises determining whether the content was stamped at a time when the certificate was valid. That is, certificates have a lifetime. The content must have been signed within the time interval defined by its lifetime. This ensures that if the certificate ever leaks out, it cannot be used beyond its validity interval.

The validation procedure passes when each of its above-enumerated component tests pass. When the client device A 302 A is assured that the content 330 has been stamped by the proper authority (e.g., the content registration authority 332) it can commit the content to its local store (not shown), and/or install it. In the context of an IM application, the content 330 might constitute a Flash program that provides animated content that implements the supplemental content portion 326 (of FIG. 3), and so forth. In one case, security-related features associated with the content 330 can be stored as an attribute of the content object, allowing this security-related information to accompany the content 330 as it is transferred throughout the system 400.

Different systems can apply different rules to determine whether a client device needs to revalidate content that it has already validated. In one case, the client device A 302 that successfully validates the content 330 can continue to use the content 330 without subsequent revalidation (until that time that the content 330 is formally revoked). In another case, the client device A 302 may require that the client security-related functionality 334 to revalidate the content 330 upon each subsequent use. In another case, the client device A 302 may require that the client security-related functionality 334 revalidate the content 330 after a certain amount of time elapses, or after a certain number of uses of the content 330, etc. Information that governs the timing of revalidation can be programmed into the client device A 302 and/or specified by the stamp metadata itself.

The same multi-part validation procedure applies when the client device A 302 attempts to transfer the content to another client device, such as client device B 304. For example, assume that the user Alice starts a conversion with user Bob. Further assume that an integral part of Alice's IM identity is an icon or other display feature that has a dynamic component implemented using content 330 that includes an executable component. (Or the content 330 may comprise a feature that can be invoked by Alice upon her command, e.g., a so-called MSN Messenger Wink). In any case, when Alice's client device A 302 communicates with Bob's client device B 304 and invokes the content 330, Bob's client device B 304 will determine if it has the content necessary to display Alice's dynamic content 330. If Bob's device B 304 does not currently provide this content 330, Bob's client device B 304 will request it from Alice's client device B 302. Such a transfer will prompt the transfer of the content 330 and the associated stamp. Like the case with Alice's initial consumption of the content 330, Bob's client device B 304 cannot consume the content 330 without first validating the content 330 using the stamp. If the content 330 has become corrupted since Alice has received it, or if Alice deliberately introduced malicious content into the network, then the propagation of this content 330 will be effectively halted at Bob's client device B 304 (and the same goes for all of the other client devices associated with Alice's buddies). This is very beneficial, as it helps stem the spread of viruses over the IM network, which, as mentioned in the Background section, has the potential of inflicting swift and severe damage to the network. If client device B 304 determines that the content is valid, then it can store and/or install it. Client device B 304 will repeat this validation upon subsequent uses according to the environment-specific criteria set forth with respect to client device A 302.

In terms of physical implementation, the content registration authority 332 can be implemented as one or more server components, databases and/or other hardware. The components of the content registration authority 332 can be located at a single site, or spread over plural sites in distributed fashion. In one exemplary case, for instance, the publisher interaction functionality 408 can be implemented as one or more servers in a first collection of servers, and the stamping functionality 410 can be implemented as one or more servers in a second collection of servers. Further, although not shown, the content registration authority 332 can include various routers, load balancing mechanisms, and so forth to distribute and manage the workload among the different components of the content registration authority 332. The components of the content registration authority 332 can be administered by a single entity or plural entities. FIG. 11 (described below) shows one exemplary computer environment that can implement any server machine described herein.

Various considerations can govern when the content publisher 328 and the content registration authority 332 cooperatively perform the above identified functions. In the case of "stock" content 330 that remains the same for all purchasing customers, the content publisher 328 can register this content 330 in advance, e.g., by forming content identifiers (hashes) for this content. Then the content registration authority 332 can provide the associated stamps for this static content 330. All of this activity happens prior to the time that the customer purchases the content 330. In another scenario, the content 330 can be modified (e.g., customized) by the user at the time of purchase. In this case, the content publisher 328 and the content registration authority 332 perform their operations when prompted by the sale itself, that is, not in advance of the sale. Still further techniques can be used for managing the operations performed by the content publisher 328 and the content registration authority 332 to suit different environments. Section B describes the procedural aspects of the system 400 in greater detail.

As a further processing improvement, results that are repeatedly used within the system 400 can be cached to eliminate the need to recalculate them. First, for instance, the publisher-end security functionality 404 of the content publisher 328 can cache the hash computed based on a particular content item (as well as its corresponding stamp, if that is available). If a user selects a content item for purchase that has already been assigned a hash value, then this hash value can be pulled from the cache memory. Second, the stamping functionality 410 can do the same; if a previously calculated stamp (or other value) is requested, this value is preferably pulled from a cache memory rather than calculated anew. Third, the client devices (302, 304, ... 306) can likewise use local caches to achieve the same benefits by avoiding the need for recalculating frequently used results.

Finally, the content publisher 328 has been described as a third party entity that provides content 330 in responses to express requests by the user. However, the content publisher can be associated with the same entity that implements the content registration authority 332. Moreover, in another implementation, the content publisher 328 can automatically download content to the client device A 302 without the user (Alice) expressly making a request for this content. This feature might be appropriate in the case of the receipt of sponsored advertising information which is injected into the IM application. (In any case, the dissemination of content need not be predicated on the payment of a fee; that is, the user can download content for free too.)

A.3. Solution B: Centrally Storing Content Identifiers

FIG. 5 shows a system which implements Solution B identified above. To repeat, solution B uses the content registration authority 332 to provide a content identifier registration service. In one case, the content registration authority 332 stores content identifiers prior to downloading the corresponding content 330 to the client devices (304, ... 306). In another case, the content registration authority 332 stores content identifiers immediately after the content 330 has been downloaded to an original recipient, e.g., to client device A 302 (providing that it has secured this indirect registration route, e.g., using the provisions described above). To facilitate explanation, the following discussion will assume that the former approach is used, that is, where the content 330 is registered prior to it being downloaded to the client device A 302. The individual features shown in FIG. 5 will be described in additional detail below.

Beginning with the content publisher 328, this component performs substantially the same functions as the same-numbered component (328) of FIG. 4. Therefore, the operations performed by the content publisher 328 will be mentioned in summary fashion in this subsection. As previously stated, the client interaction functionality 402 serves the role of interacting with the client devices (302, 304, ... 306). For example, this functionality 402 provides an interface through which client devices (302, 304, ... 306) can review and purchase content items 330. The publisher-end security functionality 404 processes the content 330 to provide a content identifier. This processing can comprise forming a hash of the content 330. One non-limiting type of hash algorithm that can be used for this task is SHA1.

In solution B, the content registration authority 332, comprises registration functionality 502, a registration data store 504, and a query-serving functionality 506. The registration functionality 502 performs the operation of storing the content identifier (e.g., the hash value) received from the content publisher 328 in the registration data store 504. The registration data store 504 performs the operation of retaining the content identifiers that have been stored therein. An exemplary content identifier, $Hash_{registered}$, is one such content identifier which is stored in the registration data store 504. The registration data store 504 can comprise a database, a flat file, or some other storage mechanism. The query-serving functionality 506 serves the role of retrieving registered content identifiers from the registration data store 504 in response to queries sent by client devices (302, 304, ... 306), and/or other possible entities in the system 500.

Finally, the registration functionality 502 also includes revocation functionality 508. As the name suggests, this functionality 502 revokes the registration of content identifiers which have been stored in the registration data store 504. In the present solution (B), revocation can be achieved by simply deleting content identifiers associated with revoked content 330 within the registration data store 504. (Recall, by contrast, that, in solution A, revocation entailed revoking stamps. Because these stamps were not centrally maintained, revocation entailed propagating revocation instructions through the network 308 to the effected client devices (302, 304, . . . 306).

The consumption of content 330 can entail forming a package 510 that contains the content 330 and possibly other data (not shown). Presume that client device A 302 has purchased the content 330 from content publisher 328. Upon receipt, the client device A 302 extracts the content 330. To validate the content 330, the client device A 302's security functionality 334 forms a separately-computed content identifier, $Hash_{computed}$. In one exemplary and non-limiting implementation, the client device 302, using this $Hash_{computed}$ value as a search key, determines whether the received content has been registered in the registration data store 504 by accessing the query-serving functionality 504. If the content 330 has been registered, the client device A 302 can be assured that the content 330 originated from a trusted partner of the content registration authority 332 (i.e., in this case content publisher 328), but without having to expressly identify the partner by prompting the user (Alice) to confirm receipt of content 330 from this partner.

The above-described validation test can be a part of a more inclusive validation procedure. Additional validation tests can determine whether the content identifier received in the package 510 matches a separately computed content identifier based on the received content 330. And like the case of solution A, upon validation of the content 330 by the client device A 302, various rules can be defined to determine how frequently that same client device A 302 needs to revalidate the content (if at all). Also, like the case of solution A, frequently used results can be cached at the head-end and/or client devices (302, 304, . . . 306) to reduce the processing burden associated with calculating and retrieving these results.

The same validation procedure occurs when client device A 302 transfers the content to client device B 304. This transfer may be triggered by the user Alice starting an IM conversation with the user Bob in the manner described above for solution A. If Bob's client device B 304 does not already contain the content 330 in its local store, then the client device B 304 will validate the content 330 in the manner described above before loading and running it. Namely, validation can comprise computing a $Hash_{computed}$ content identifier and using this value as a key to determine whether the content 330 has been registered in the data store 504.

The same benefits can be achieved through the registration-based validation scheme of solution B as described for solution A. Namely, although an entity can conceivably introduce malicious content into the local store of a client device, the registration-based validation scheme prevents this malicious content from being propagated through the network. Further, the user in solution B, like solution A, does not need to expressly approve receipt of content 330 from trusted partners.

In terms of physical implementation, the content publisher 328 and the content registration authority 332 can be implemented in a similar manner as was described for solution A. Namely, the components of this functionality (328, 332) can be implemented as different groups of server components, databases, and/or other hardware devoted to respective different associated tasks. The components of this functionality (328, 332) can be located at respective single sites, or spread over plural sites in distributed fashion. Although not shown, this functionality (328, 332) can include various routers, load balancing mechanisms, and so forth to distribute and manage the workload among the different components of this functionality (328, 332). The components of the content publisher 328 and the content registration authority 332 can each be administered by a single entity or plural entities. FIG. 11 below shows one exemplary computer environment that can implement any server-based functionality described herein.

In the same manner specified for solution A, various considerations can govern when the content publisher 328 and the content registration authority 332 perform the above-identified functions. In the case of "stock" content 330 that is the same for all purchasing customers, the content publisher 328 can register this content 330 in advance, e.g., by forming content identifiers (hashes) for this content. Then the content registration authority 332 can provide the associated stamps for this content 330 (all prior to the time that the customer purchases the content 330). In another scenario, the content 330 can be modified (e.g., customized) by the user at the time of purchase. In this case, the content publisher 328 and the content registration authority 332 perform their operations when prompted by the sale itself, that is, not in advance of the sale, as in the above-indicated manner. Still further techniques for managing the operations performed by the content publisher 328 and the content registration authority 332 are possible to suit different environments. Section B describes the procedural aspects of the system 500 in greater detail.

B. Exemplary Method of Operation (FIGS. 6, 7, 8 and 9)

FIGS. 6-9 describe the operation of the registration-based validation scheme in flow chart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure. As the functions performed by the content-based registration scheme have been fully explicated in prior sections, this section will serve primarily as a review of those functions.

B.1. General Procedure

Figure 6:
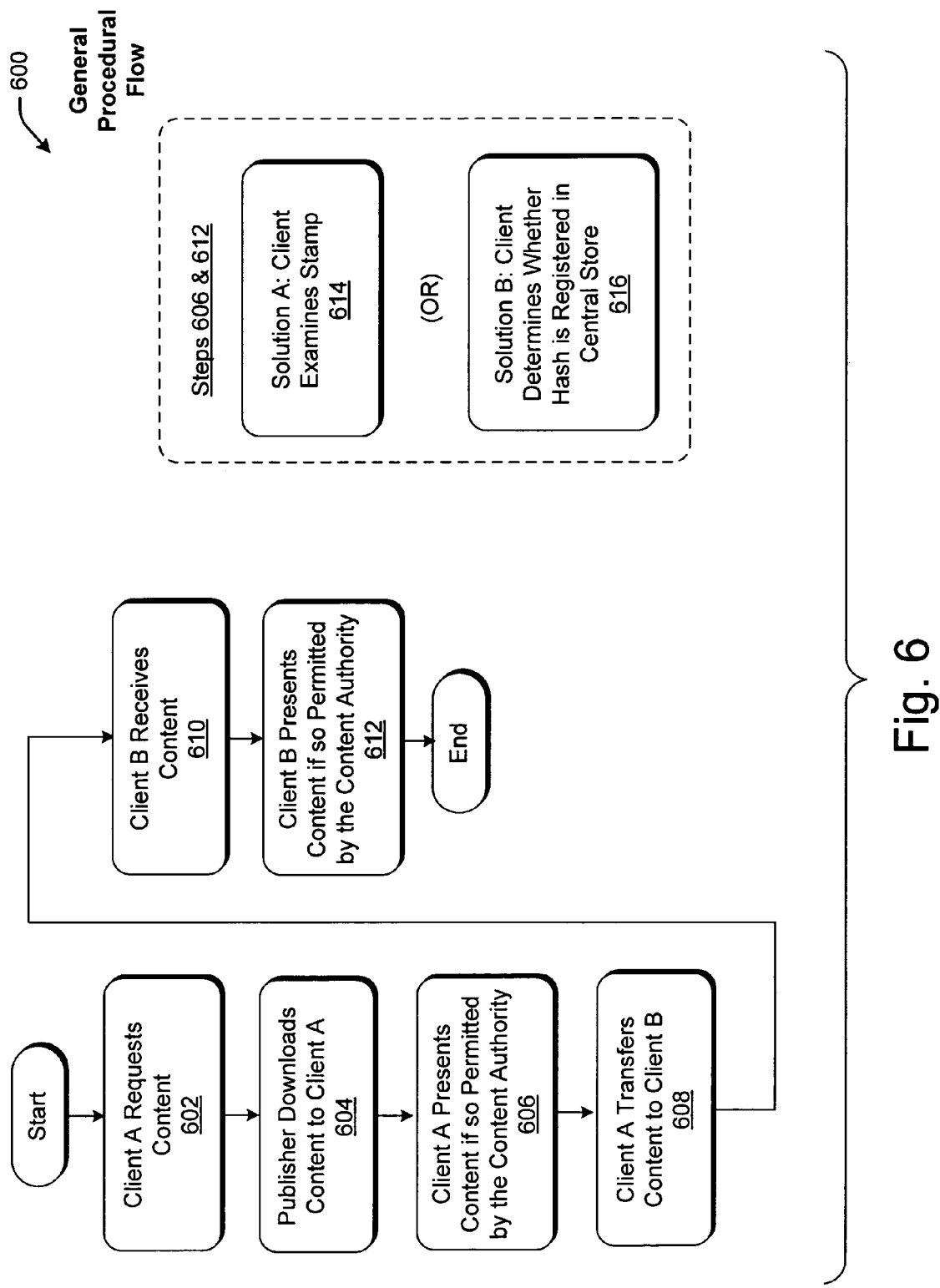
FIG. 6 shows an overview of a procedure for securely transferring content using either solutions A or B.

FIG. 6 shows a general procedure 600 for performing registration-based validation of content 330. In step 602, the user (e.g., Alice) accesses the content publisher 328 via the client interaction functionality 402 to request content 330 to be downloaded to her. In step 604, the content publisher 328 downloads the requested content to the user. In the case where the user has requested static content 330, the content publisher 328 may have been able to conduct the registration of the product that it is downloading to the user in advance of the user's request. However, where the user receives customized content, registration is prompted by the user's selection of the content 330.

In step 606, the user, Alice, presents the content 330 at her client device A 302 if the outcome of a validation procedure indicates that the content 330 can be trusted. The consumption of the content 330 preferably does not involve the generation of any security queries for Alice's review. That is, if the registration-based validation scheme indicates that content 330 originates from a trusted source, then the client device A 302 automatically consumes the content 330 without performing validation on a provider-specific level.

In step 608, the user, Alice, communicates with another use, Bob. This can occur when Alice opens an IM dialog session with Bob, prompting the presentation of the kind of dialog pane 318 shown in FIG. 3.

In step 612, the user, Bob, consumes the received content 330 if the registration-based security scheme, performed again for Bob's client device B 304, indicates that the content 330 originates from a trusted source.

As the reader will appreciate, the operations shown in FIG. 6 can be repeated many times each time that the content is propagated from one client device to another. (Optionally, frequently calculated results can be pulled from various caches maintained in the system 300). If the content acquires a virus, it will be effectively removed from the system by virtue of the fact that the validation scheme prevents any client device (302, 304, ... 306) that receives malicious content from successfully loading and running the content. Therefore, although a virus could conceivably be introduced to a local client device through hacking into this local client device, such a virus is not allowed to propagate out to other client devices.

The right-hand portion of FIG. 6 summarizes the different types of registration-based validation paradigms that can be used by solutions A and B in the context of steps 606 and 612. Step 614 corresponds to registration-based validation performed by solution A. As part of this validation scheme, the client device (302, 304) accesses the stamp associated with the received content 330 to determine whether the content 330 is vouched for by a chain of authorities that terminates in the content registration authority 332 (and originates with a certificate associated with the stamp). Step 616 corresponds to the registration-based validation performed by solution B. In this validation scheme, the client device (302, 304) computes a content identifier for the received content 330 and determines whether a counterpart content identifier is stored in the registration data store 504.

Figure 7:
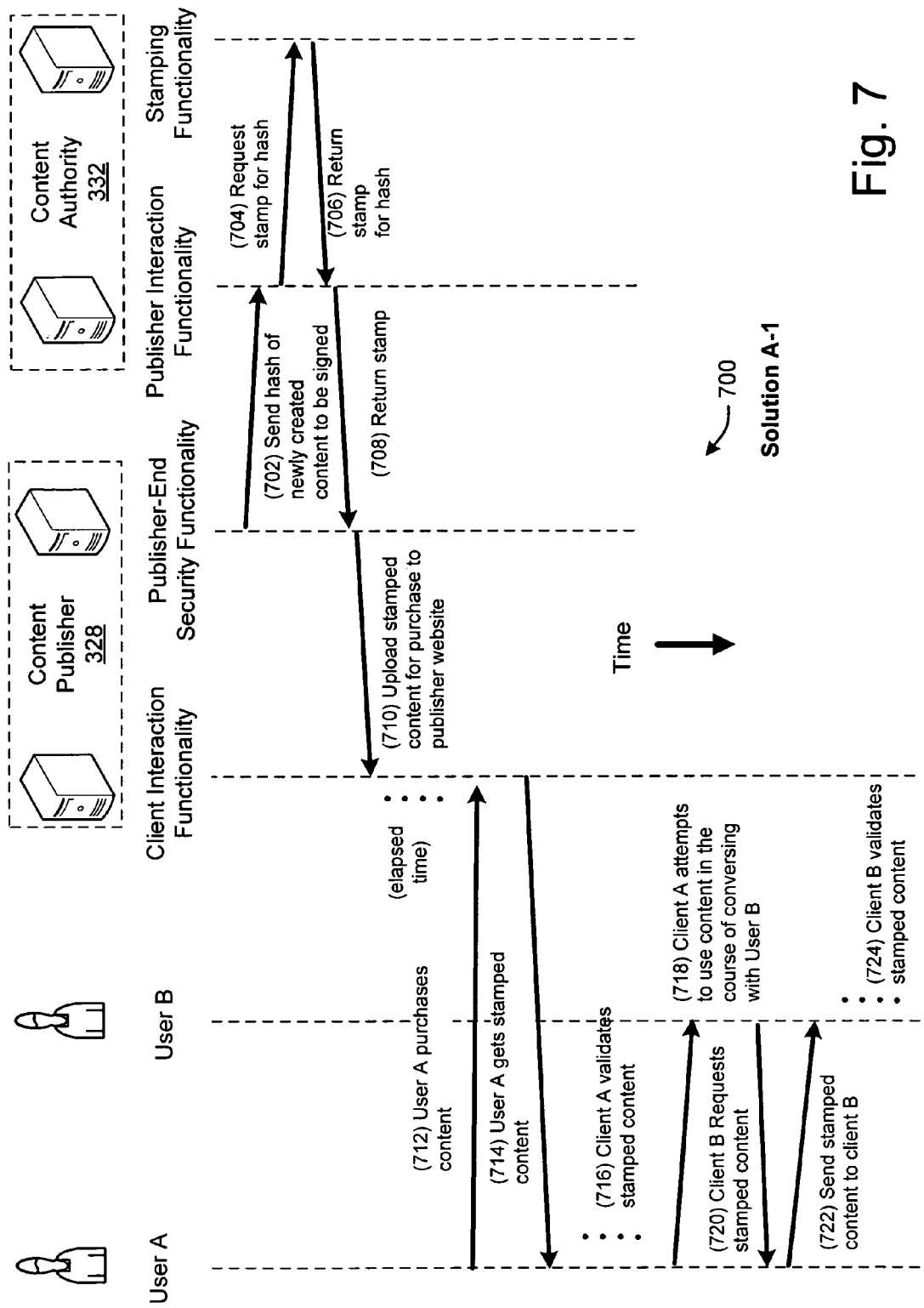
FIGS. 7 and 8 show procedures for securely transferring content using solution A.
Figure 8:
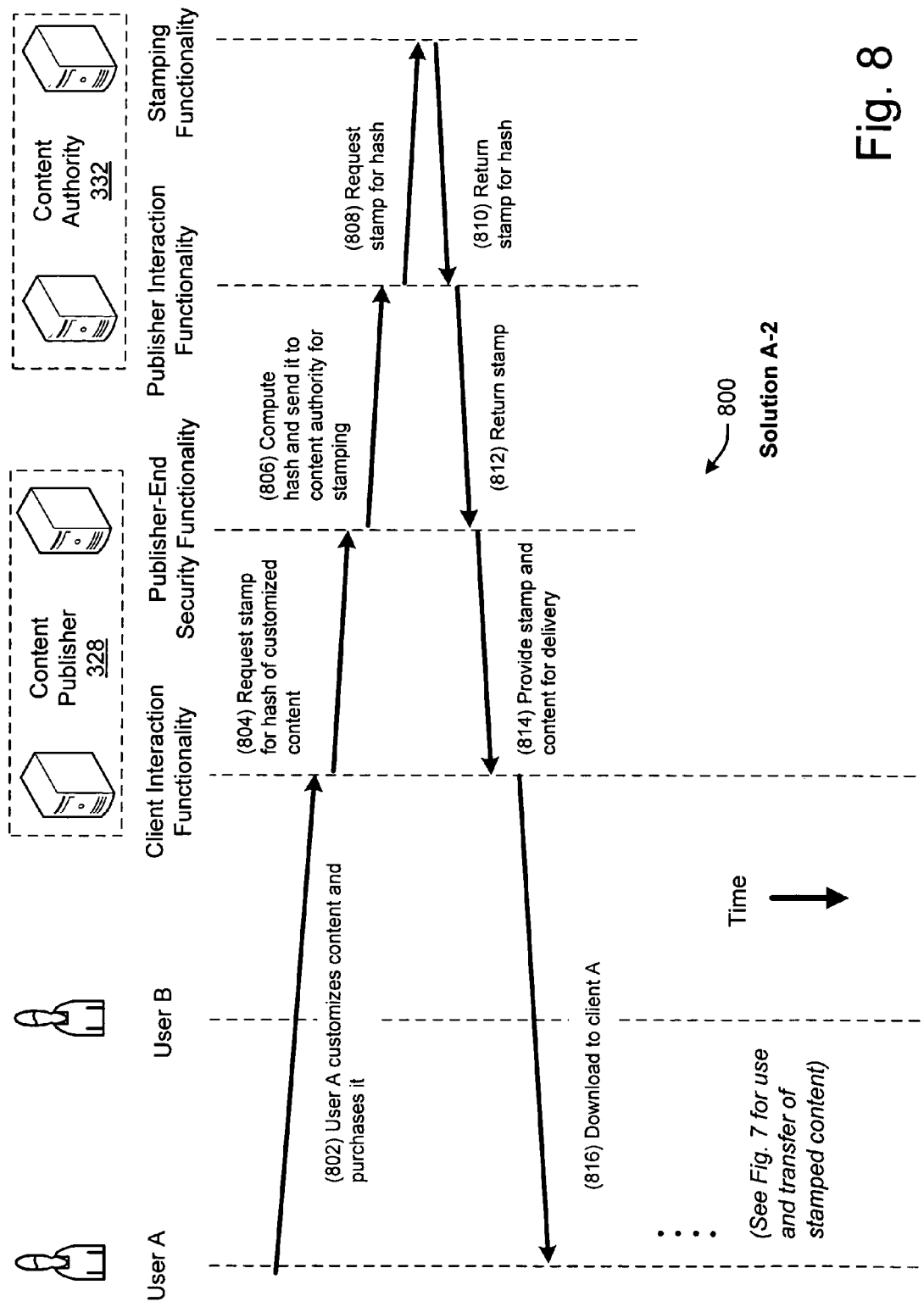
Figure 9:
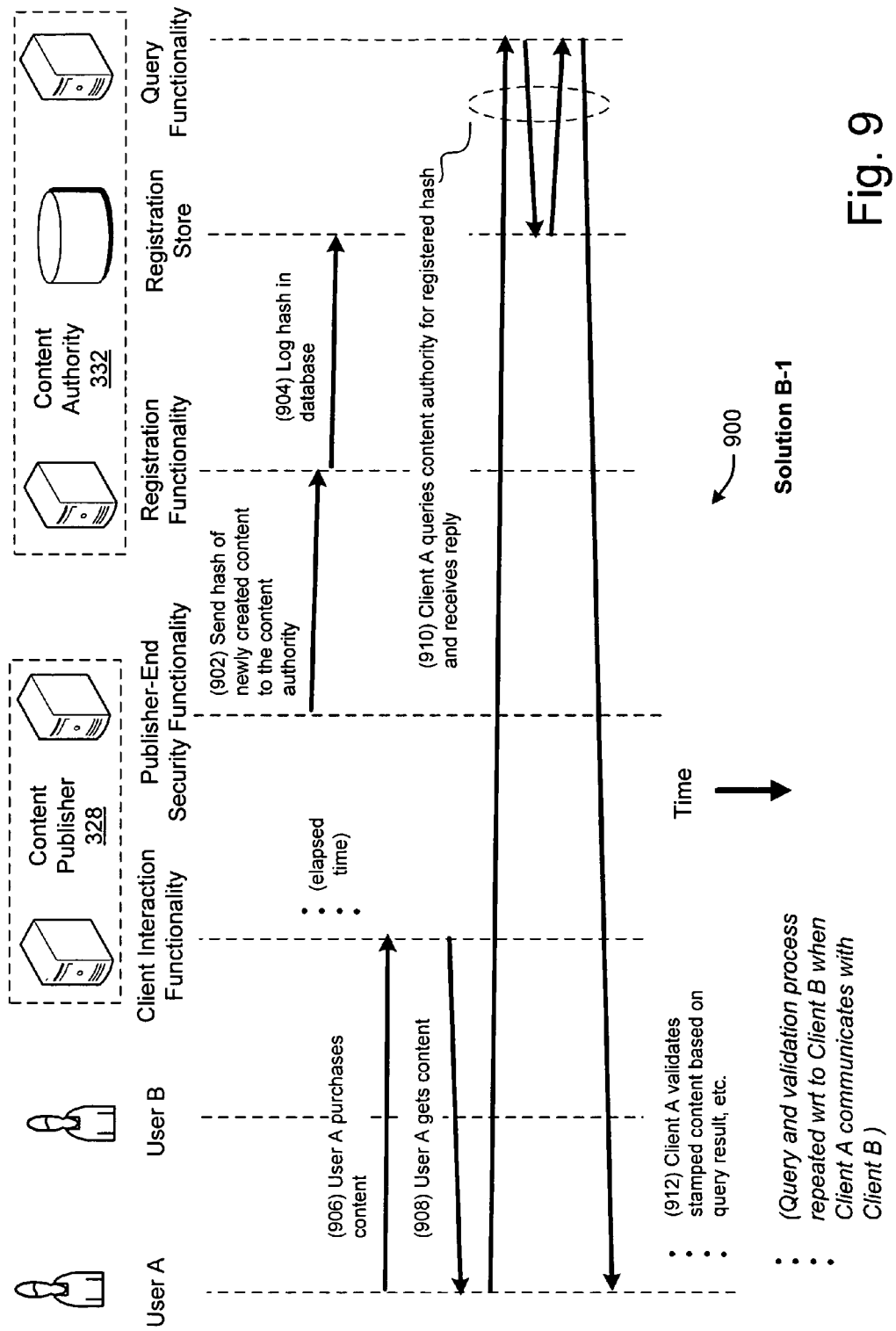
FIG. 9 shows a procedure for securely transferring content using solution B.

FIGS. 7, 8, and 9 provide three specific examples which illustrate the general principles described in FIG. 6. These figures show exemplary sequences of operations, with the horizontal axis corresponding to different actors involved in the operations, and the vertical axis corresponding to time (however, these figures are not scaled to illustrate the actual time required by different operations, this being dependant on various environment-specific factors).

B.2. Procedural Aspects of Solution A

To begin with, FIG. 7 shows a procedure 700 which implements solution A. More particularly, the procedure 700 corresponds to a scenario in which the content publisher 328 is able to perform some registration functions in advance of the users' purchase of corresponding content items. This might be the case where the content items are "stock" items that do not change.

In step 702, in advance of purchase, the publisher-end security functionality 404 sends a hash of the newly created content to be signed by the content registration authority 332. This communication can take place using a SOAP request, by specifying the hash, the provider ID, and so forth.

In step 704, the publisher interaction functionality 408 responds to the publisher-end security functionality 404 by requesting the stamping functionality 410 to generate a stamp of the hash.

In step 706, the stamping functionality 410 computes the stamp and returns it to the publisher interaction functionality 408.

In step 708, the publisher interaction functionality 408 forwards the computed stamp to the publisher-end security functionality 404. This communication can take place using the same communication route used to send the SOAP request. The SOAP response can specify the stamp, e.g., including the hash, a timestamp, a signed version of the hash and timestamp, certificate information, and so forth.

In step 710, the publisher-end security functionality 404 in association with the client interaction functionality 402 make the registered content available for purchase, e.g., over a website maintained by the client interaction functionality 402 for this purpose.

Some time later, in step 712, the user Alice purchases content from the client interaction functionality 402.

In response, in step 714, Alice receives the package 406 including the purchased content 330 and accompanying stamp.

In step 716, the client device A 302 validates the received content based on the accompanying stamp. Validation comprises, in part, determining whether the stamp ultimately identifies the content registration authority 332 as the entity which has vouched for the integrity of the content 330. Another component of the validation procedure determines whether the hash value in the package 406 matches a separately computed hash value based on the received content 330. Another component of the validation procedure determines whether the stamp remains active (e.g., has been revoked).

In step 718, Alice attempts to use the content 330 in conversing with Bob. For instance, the content may comprise an integral part of the Alice's identity which she wishes to present to others when she communicates with them. Or the content may comprise a feature that can be invoked by Alice upon command (e.g., a so-called MSN Messenger Wink).

In step 720, Bob's client device B 304 requests the content 330 that Alice has downloaded, that is, if Bob does not already have this content 330.

In step 722, Alice's client device A 302 sends Bob's client device B 304 the requested content.

And in step 724, Bob's client device B 304 validates the received content 330 in the same manner as described above with respect to Alice. Namely, among other tests, Bob's client device B 304 determines whether the stamp associated with the content 330 ultimately points to the content registration authority 332. If validation procedure is successful, the client device B 304 determines that it is safe to consume the content 330.

FIG. 8 shows another procedure 800 which also corresponds to solution A. The procedure 800 varies from the procedure 700 in that the user, Alice, is permitted to customize the content 330 at the time of purchase. This means that the content publisher 328 and the content registration authority 332 cannot register the content in advance. That is, registration must proceed after the user customizes the content 330, because the content 330 does not exist in final form until after the user creates it, and therefore cannot be registered in advance.

In step 802, Alice customizes the content 330 and purchases it via the client interaction functionality 402. As stated, the client interaction functionality 402 can provide a web interface through which the user, Alice, can perform this function.

In step 804, the client interaction functionality 402 requests the publisher-end security functionality 404 to perform a hash of the content 330 in preparation for the creation of a stamp for the content.

In step 806, the publisher-end security functionality 404 computes the hash and sends it to the content registration authority 332 for the creation of a stamp. This communication can take place using a SOAP request over the secure channel 412.

In step 808, the publisher interaction functionality 408 responds to the publisher-end security functionality 404 by requesting the stamping functionality 410 to generate a stamp of the hash.

In step 810, the stamping functionality 410 computes the stamp and returns it to the publisher interaction functionality 408.

In step 812, the publisher interaction functionality 408 forwards the computed stamp to the publisher-end security functionality 404. This communication can take place using a SOAP response over the secure channel 412.

In step 814, the publisher-end security functionality 404 in association with the client interaction functionality 402 makes the registered content available for downloading, e.g., over a website maintained by the client interaction functionality 402 for this purpose.

In step 816, the client interaction functionality 402 forwards the stamp and accompanying stamp to the user, Alice.

The remainder of the procedure 800 corresponds to the steps outlined with respect to procedure 700 shown in FIG. 7, in which Alice's client device A 302 validates the content 330, followed by Bob's client device B 304 upon the start of the conversation between Alice and Bob (or when Alice invokes the content 330 upon command).

B.3. Procedural Aspects of Solution B

FIG. 9 shows another procedure 900 which corresponds to solution B. Solution B involves the registration of content items by storing them in the registration data store 504, rather than the generation of stamps. The procedure 900 otherwise corresponds to the purchase scenario of FIG. 7, in which the content publisher 328 and the content registration authority 332 are able to register the content in advance (e.g., because the content 330 is stable).

In step 902, the publisher-end security functionality 404 computes a hash of the newly created content 330 sends it to the content registration authority 332. Alternatively, the publisher-end security functionality 404 can transfer the content 330 itself to the content registration authority 332, upon which the content registration authority 332 can use its own resources to process the content 330 and form the hash.

In step 904, the registration functionality 502 receives the hash and stores it in the registration data store 504.

Some time later, in step 906, the user, Alice, can purchase the content 330 that has been registered in the registration data store 504. The user Alice can perform this function by interacting with a web service maintained by the client interaction functionality 402.

In step 908, the client interaction functionality 402 can download the purchased content 330 to Alice's client device A 302.

In steps 910 and 912, Alice's client device A 302 then goes about validating the received content. Validation for solution B comprises contacting the query functionality 506 to determine whether there is a counterpart registered content identifier stored in the registration data store 504, and if so, returning a result of this lookup to the client device A 302. That is, Alice's client device A 302 can compute a separately computed content identifier (based on the received content 330 itself) and use this information as an index to determine whether the content has been previously registered in the data store 504.

Although not shown, a similar validation process can be performed with respect to client device B 304 when client device A 302 communicates with client device B 304, thus invoking the content 330 at client device B 304.

Although not shown, a counterpart procedure to the procedure 800 shown in FIG. 8 can be performed in the context of solution B. Namely, in the case that a user purchases content which she customizes, then registration is more closely coupled to subsequent validation. Namely, in this case, registration is invoked by the purchase itself, and can be performed prior to the downloading of the content to the client device A 302, or immediately after downloading the content 330 to the client device A 302.

C. Other Exemplary Applications (FIG. 10)

The advantages of the use of the registration-based validation scheme were framed above primarily in the context of the ability of this mechanism to prevent the spread of viruses over networks, and particularly over networks that accommodate an IM application. While this is an important benefit, the registration-based validation scheme also accommodates a number of business models which are advantageous from other perspectives, such as marketing perspectives.

Figure 10:
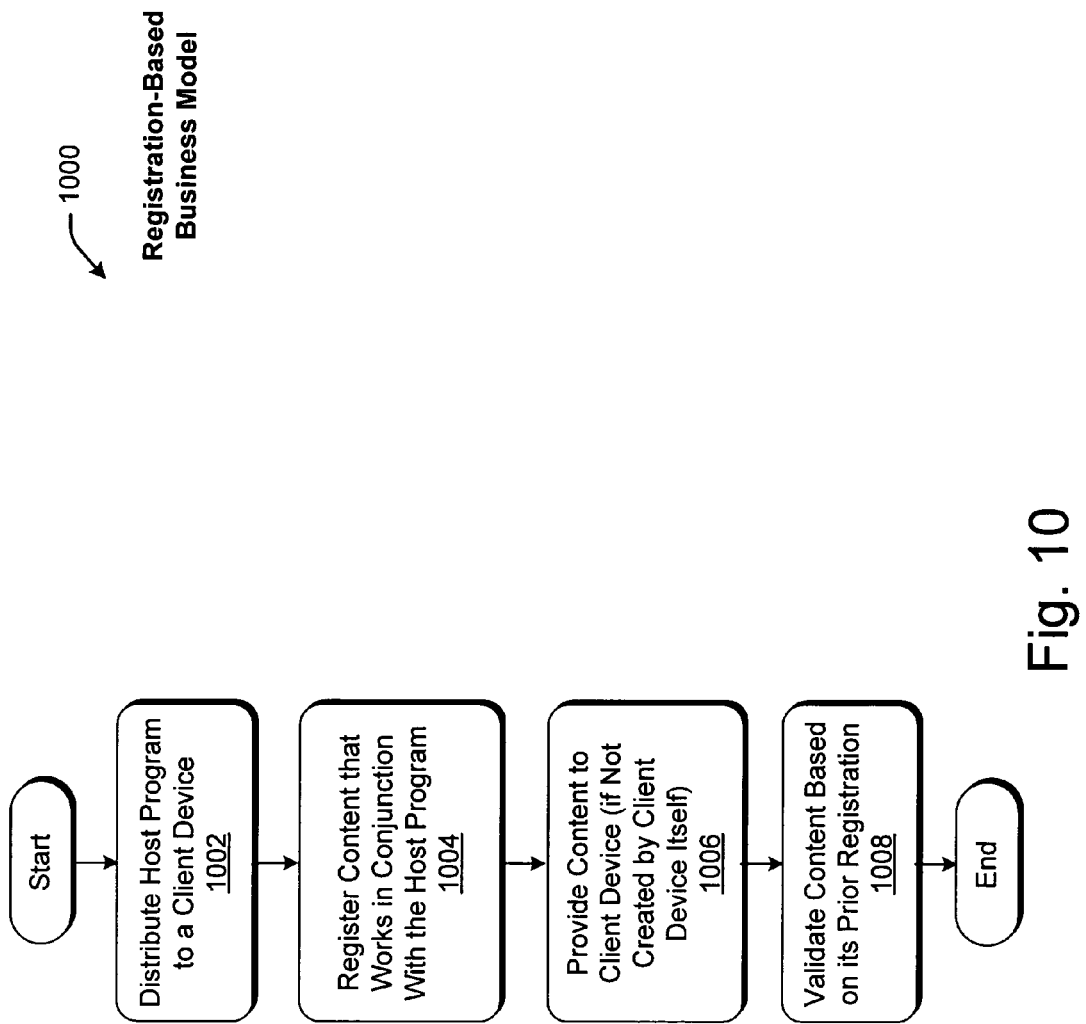
FIG. 10 shows a business model predicated on the use of the content registration authority of the systems shown in FIGS. 3-5.

Consider the exemplary model set forth in the procedure 1000 show in FIG. 10. By way of overview, this model corresponds to a scenario where an entity distributes a main program to users. Then supplemental content that can be used in conjunction with the main program is made available to the users via the registration based validation scheme described above.

In step 1002 of this procedure 1000, the entity distributes a host program to at least one client device A 302. For example, the host program might be a program used to provide instant messaging (IM) services, a program used to provide document editing and display services, a program used to play content having a certain format (e.g., Flash-based format), and so forth.

In step 1004, the entity can register content that works in conjunction with the host program using one of the solutions described above (solution A or solution B, or some other variation solution). This content can be produced by any entity. For example, this content can be produced by the entity which provides the host program. Or this content can be produced by partner entities by agreement with the entity which provides the host program. Or this content can be produced by the end users themselves, and so forth.

In step 1006, the creator of the supplementary content can download this content to the client devices that have purchased or otherwise selected this content (if, in fact, the content was created at a source that is remote from the client devices; as mentioned above, the end users themselves can alternatively create the content, and, in this case, no downloading of content would be required).

And in step 1108, the client devices which wish to consume the downloaded content (or content created by the end users) can validate the content in accordance with solution A, solution B, or some other solution. The content cannot be consumed without it having been properly registered.

According to one implementation, an entity can distribute the host program free of charge, yet distribute (or otherwise enable the consumption of) the supplementary content that is used in conjunction with the main program based on a fee. Or an entity can distribute the host program free of charge, yet make the creation of the supplementary content by any entity (such as the end users themselves) contingent on the payment of a fee. In other words, this fee can be assessed on a per-content-item basis, and can be assessed at different consumption points: in a first case, the fee can be assessed to enable receiving (downloading) the content item; in a second case, the fee can be assessed to enable consuming the content item after receipt; and in a third case, the fee can be assess to create the content item.

For example, assume that the host program corresponds to document creation and display technology (such as PDF technology produced by Adobe Systems Inc., of San Jose, Calif., or the like). The entity that provides the base technology can do so free of charge, but then assesses a fee on a per-document basis to create documents that are readable/editable using this base technology.

This paradigm may confer benefits to all participants involved. For example, in many cases, a consumer may wish to purchase individual content items (that the consumer downloads for a fee or creates for a fee) used in conjunction with a host program, rather than the host program itself which the user may use relatively infrequently.

Further, although many partner content publishers may be involved in distributing the content to requesting client devices, the entity that administers the content registration authority can maintain control over this activity (by virtue of it acting in the role of a central validator).

Still other business paradigms can be developed based on the registration-based validations schemes described herein to the mutual benefit of all participants involved in the schemes.

D. Exemplary Computer Environment (FIG. 11)

In one exemplary implementation, certain aspects of the registration-based validation scheme can be implemented as computer code executed by one or more computer devices. For example, server machines associated with the content publisher 328, the content registration authority 332, or some other component of the system 300 can be implemented by one or more computer devices. Also, the client devices (302, 304, ... 306) can be implemented by computer devices. In this case, FIG. 11 also provides information regarding an exemplary computer environment 1000 that can be used to implement any such computer device (302, 304, ... 306).

The computing environment 1100 includes a general purpose or sever type computer 1102 and a display device 1104. However, the computing environment 1100 can include other kinds of computing equipment. For example, although not shown, the computer environment 1100 can include handheld or laptop devices, set top boxes, game consoles, mainframe computers, etc. Further, FIG. 11 shows elements of the computer environment 1100 grouped together to facilitate discussion. However, the computing environment 1100 can employ a distributed processing configuration. In a distributed computing environment, computing resources can be physically dispersed throughout the environment.

Exemplary computer 1102 includes one or more processors or processing units 1106, a system memory 1108, and a bus 1110. The bus 1110 connects various system components together. For instance, the bus 1110 connects the processor 1106 to the system memory 1108. The bus 1110 can be implemented using any kind of bus structure or combination of bus structures, including a memory bus or memory controller, a peripheral bus, an accelerated graphics port, and a processor or local bus using any of a variety of bus architectures.

Computer 1102 can also include a variety of computer readable media, including a variety of types of volatile and non-volatile media, each of which can be removable or non-removable. For example, system memory 1108 includes computer readable media in the form of volatile memory, such as random access memory (RAM) 1112, and non-volatile memory, such as read only memory (ROM) 1114. ROM 1114 includes an input/output system (BIOS) 1116 that contains the basic routines that help to transfer information between elements within computer 1102, such as during start-up. RAM 1112 typically contains data and/or program modules in a form that can be quickly accessed by processing unit 1106.

Other kinds of computer storage media include a hard disk drive 1118 for reading from and writing to a non-removable, non-volatile magnetic media, a magnetic disk drive 1120 for reading from and writing to a removable, non-volatile magnetic disk 1122 (e.g., a "floppy disk"), and an optical disk drive 1124 for reading from and/or writing to a removable, non-volatile optical disk 1126 such as a CD-ROM, DVD-ROM, or other optical media. The hard disk drive 1118, magnetic disk drive 1120, and optical disk drive 1124 are each connected to the system bus 1110 by one or more data media interfaces 1128. Alternatively, the hard disk drive 1118, magnetic disk drive 1120, and optical disk drive 1124 can be connected to the system bus 1110 by a SCSI interface (not shown), or other coupling mechanism. Although not shown, the computer 1102 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1102. For instance, the readable media can store the operating system 1130, application-specific functionality 1132 (including functionality for implementing aspects of the registration-based validation methodology), other program modules 1134, and program data 1136.

The computer environment 1100 can include a variety of input devices. For instance, the computer environment 1100 includes the keyboard 1138 and a pointing device 1140 (e.g., a "mouse") for entering commands and information into computer 1102. The computer environment 1100 can include other input devices (not illustrated), such as a microphone, joystick, game pad, satellite dish, serial port, scanner, card reading devices, digital or video camera, etc. Input/output interfaces 1142 couple the input devices to the processing unit 1106. More generally, input devices can be coupled to the computer 1102 through any kind of interface and bus structures, such as a parallel port, serial port, game port, universal serial bus (USB) port, etc.

The computer environment 1100 also includes the display device 1104. A video adapter 1144 couples the display device 1104 to the bus 1110. In addition to the display device 1104, the computer environment 1100 can include other output peripheral devices, such as speakers (not shown), a printer (not shown), etc.

Computer 1102 operates in a networked environment using logical connections to one or more remote computers, such as a remote computing device 1146. The remote computing device 1146 can comprise any kind of computer equipment, including a general purpose personal computer, portable computer, a server, etc. Remote computing device 1146 can include all of the features discussed above with respect to computer 1102, or some subset thereof.

Any type of network 1148 can be used to couple the computer 1102 with remote computing device 1146, such as the WAN 402 of FIG. 4, a LAN, etc. The computer 1102 couples to the network 1148 via network interface 1150 (e.g., the interface 416 shown in FIG. 4), which can utilize broadband connectivity, modem connectivity, DSL connectivity, or other connection strategy. Although not illustrated, the computing environment 1100 can provide wireless communication functionality for connecting computer 1102 with remote computing device 1146 (e.g., via modulated radio signals, modulated infrared signals, etc.).

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for registering at a content registration authority content published by a content publisher trusted by the content registration authority, the method comprising:
   accessing a content identifier representing the content;
   determining whether the content is from a content publisher trusted by the content registration authority;
   registering that the content is trustworthy content at the content registration authority by storing the content identifier in a registration data store associated with the content registration authority; and
   receiving a query from a client device and confirming that the registration data store includes a client identifier corresponding to the content identifier of the content, such that the client device can automatically consume the trustworthy content in a secure fashion without prompting a user of the client device to explicitly approve of the trustworthy content or the content publisher.

2. The method of claim 1, wherein the content includes instructions that prompt a processor device to perform at least one operation.

3. The method of claim 1, wherein the content identifier comprises a hash of the content.

4. The method of claim 1, wherein the client device receives the content directly from the content publisher.

5. The method of claim 1, wherein the client device receives the content from another client device.

6. The method of claim 1, wherein the accessing comprises forming a hash of the content at the content registration authority.

7. The method of claim 1, further comprising a preliminary operation of transferring a host program, associated with the content registration authority, to the client device, wherein the content comprises information that is used in conjunction with the host program.

8. The method of claim 7, wherein the host program comprises at least one of: an application for conducting IM communication; an application for creating, manipulating, and/or rendering a document; an application for creating, manipulating, or rendering script-based content.

9. The method of claim 7, wherein the content registration authority transfers the host program to the client device free of charge, and a fee is charged for providing the content or enabling the creation of the content that is used in conjunction with the host program.

10. The method of claim 1, further comprising:
    removing the content identifier from the registration data store when the content is found to no longer be trustworthy content.

11. The method of claim 1, wherein the registering occurs before the content publisher transfers the content to the client device.

12. The method of claim 1, wherein the registering occurs via a secure communication route after the content publisher associated with the trustworthy content transfers the content to the client device.

13. A content registration authority comprising logic configured to implement the method of claim 1.

14. A method for registering content at a content registration authority, the content being published by a content publisher trusted by the content registration authority, the method comprising:
    accessing a content identifier representing the content;
    based upon the content identifier, determining whether the content is from a content publisher trusted by the content registration authority;
    in response to determining that the content is from content publisher trusted by the content registration authority, ensuring that the content is trustworthy;
    in response to the ensuring, registering that the content is trustworthy at the content registration authority by storing the content identifier in a registration data store associated with the content registration authority, wherein the trustworthy content is configured for use in an instant messaging application; and
    receiving a query from a client device and confirming that the registration data store includes a client identifier corresponding to the content identifier of the content, such that the client device can automatically consume the trustworthy content in a secure fashion without prompting a user of the client device to explicitly approve of the trustworthy content or the content publisher.

15. The method of claim 14, wherein the content identifier comprises a hash of the content.

16. The method of claim 14, wherein the client device receives the content from another client device.

17. The method of claim 14, wherein the accessing comprises forming a hash of the content at the content registration authority.

18. The method of claim 14, further comprising removing the content identifier from the registration data store when the content is found to no longer be trustworthy content.

19. The method of claim 14, wherein the registering occurs before the content publisher transfers the content to the client device.

20. One or more computer-readable media having computer-readable instructions thereon which, when executed by one or more computers, direct the one or more computers to perform a method for registering content at a content registration authority, the content being published by a content publisher trusted by the content registration authority, the method comprising:
    accessing a content identifier representing the content;
    based upon the content identifier, determining whether the content is from a content publisher trusted by the content registration authority;
    in response to determining that the content is from content publisher trusted by the content registration authority, confirming that the content is trustworthy;
    in response to the confirming, registering that the content is trustworthy at the content registration authority by storing the content identifier in a registration data store associated with the content registration authority, wherein the content is configured for use in an instant messaging application; and
    receiving a query from a client device and confirming that the registration data store includes a client identifier corresponding to the content identifier of the content, such that the client device can automatically consume the trustworthy content in a secure fashion without prompting a user of the client device to explicitly approve of the trustworthy content or the content publisher.

* * * * *

UNITED STATES PATENT AND TRADEMARK OFFICE
CERTIFICATE OF CORRECTION

| | | |
|---|---|---|
| PATENT NO. | : 7,716,243 B2 | |
| APPLICATION NO. | : 11/065983 | |
| DATED | : May 11, 2010 | |
| INVENTOR(S) | : Eyal Schwartz et al. | |

It is certified that error appears in the above-identified patent and that said Letters Patent is hereby corrected as shown below:

In column 10, line 32, before "itself" insert -- 330 --.

In column 18, line 18, delete "Vulnerability ,"" and insert -- Vulnerability," --, therefor.

Signed and Sealed this
Fifteenth Day of February, 2011

David J. Kappos
*Director of the United States Patent and Trademark Office*